(12) United States Patent
Murata et al.

(10) Patent No.: US 6,832,723 B2
(45) Date of Patent: Dec. 21, 2004

(54) SCANNER APPARATUS AND MULTIFUNCTION DEVICE HAVING A SCANNER

(75) Inventors: Sadao Murata, Okaya (JP); Hideki Furihata, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/172,076

(22) Filed: Jun. 14, 2002

(65) Prior Publication Data

US 2002/0195492 A1 Dec. 26, 2002

(30) Foreign Application Priority Data

Jun. 22, 2001 (JP) ........................................ 2001-190296
Aug. 20, 2001 (JP) ........................................ 2001-249557

(51) Int. Cl.⁷ .............................................. G06K 7/00
(52) U.S. Cl. ...................................... 235/439; 271/315
(58) Field of Search ................................ 235/439, 449, 235/475–486, 493; 271/3.15, 3.17, 228, 250; 358/474, 448, 498

(56) References Cited

U.S. PATENT DOCUMENTS

| | | | | |
|---|---|---|---|---|
| 4,384,197 A | * | 5/1983 | Kawakami | 235/485 |
| 5,466,914 A | * | 11/1995 | Kitahara | 235/483 |
| 5,661,571 A | * | 8/1997 | Ijuin et al. | 358/471 |
| 5,789,727 A | | 8/1998 | Teradaira et al. | 235/449 |
| 5,886,334 A | | 3/1999 | D'Entremont et al. | 235/380 |
| 5,965,862 A | | 10/1999 | Momose | 235/449 |
| 5,969,371 A | * | 10/1999 | Andersen et al. | 250/559.15 |
| 6,043,906 A | * | 3/2000 | Kikuchi | 358/475 |
| 6,068,187 A | * | 5/2000 | Momose | 235/449 |
| 6,182,896 B1 | | 2/2001 | Momose | 235/449 |
| 6,290,129 B2 | | 9/2001 | Momose | 235/449 |

FOREIGN PATENT DOCUMENTS

| | | |
|---|---|---|
| EP | 0 895 868 A2 | 2/1999 |
| EP | 1 041 806 A2 | 10/2000 |
| EP | 1 080 927 A1 | 3/2001 |
| JP | 60-167460 | 11/1985 |
| JP | 63-135271 | 6/1988 |
| JP | 04-205488 | 7/1992 |
| JP | 05-058514 | 3/1993 |
| JP | 5-105298 | 4/1993 |
| JP | 6-86001 | 3/1994 |
| JP | 8-235309 | 9/1996 |
| JP | 9-504891 | 5/1997 |
| JP | 10-83438 | 3/1998 |
| JP | 10-200673 | 7/1998 |
| JP | 10-509538 | 9/1998 |
| JP | 11-7497 | 1/1999 |
| JP | 11-027443 | 1/1999 |
| JP | 11-075030 | 3/1999 |
| JP | 11-129551 | 5/1999 |
| JP | 2000-344428 | 12/2000 |
| WO | 95/11493 | 4/1995 |
| WO | 95/35217 | 12/1995 |
| WO | 96/10798 | 4/1996 |

* cited by examiner

*Primary Examiner*—Diane I. Lee
(74) *Attorney, Agent, or Firm*—Mark P. Watson

(57) ABSTRACT

A multifunction device having a pressure feed roller opposite a scanner that advances a sheet while holding it against the scanning glass and avoids sheets being caught by the pressure feed roller and prevents jams and shifts in the feed pitch using a retraction mechanism. The multifunction device 10 has a transportation path 15 for guiding the check P. Located along the transportation path 15 are print heads 21, 23 for printing on the check P, a scanner head 25 for scanning the printed side of the check P, scanner feed rollers 26 for advancing while pressing the check P against the scanner head 25, and a roller retraction mechanism 32 for retracting the scanner feed rollers 26 from the scanner head 25 to open the transportation path 15.

14 Claims, 21 Drawing Sheets

SCANNER APPARATUS AND MULTIFUNCTION DEVICE HAVING A SCANNER

BACKGROUND OF THE INVENTION

1. Field of the Invention

The present invention relates to a scanner apparatus for scanning sheets such as personal checks, and relates to a multifunction device such as a check processing system having a sheet scanner and a print head for printing on the sheets.

2. Description of the Related Art

Multifunction devices have been developed that can be used for more than one task by combining a printer, which is equipped with a print head, with a scanner or other such processing device, for example. A multifunction device so equipped with a print head and scanner can be used to print required information on the check, scan and capture an image of the printed check, and send the scanned image to a bank or other financial institution, as necessary, thereby enabling on-line settlement of check transactions using digitized transaction content data.

There are two types of scanners used in such multifunction devices, ones that scan with the sheet (check) stationary, and ones that scan while the sheet is conveyed passed the scanner. This latter type typically has a feed roller disposed opposite the scanning position for transporting the sheet while pressing it against the scanner.

A problem with scanners having this type of pressure feed roller is that when the edge of the sheet enters between the scanner and pressure feed roller, jams can result if the paper catches. The likelihood of jams occurring increases particularly when the sheet is in poor condition (such as being curled, creased, or torn).

Furthermore, if the leading edge of the sheet reaches the pressure feed roller before another operation is completed (such as printing or MICR reading) and the feed pitch is shifted as a result of the sheet being caught by the roller, the precision of the other operation will drop and the operation may not be completed normally.

A further problem is that when such a feed roller is used, the roller directly contacts the reading surface (a scanning glass, for example) of the scanner after sheet transportation is completed, potentially increasing the drive load. When it is necessary to scan to the trailing edge of the sheet, it is particularly difficult to prevent the feed roller from directly contacting the scanning glass surface. Damage to the drive power source and transfer gears as a result of overloading is therefore possible. If a stepping motor is used for the drive power source, an overloaded feed roller can also cause the stepping motor to skip, producing undesirable noise.

OBJECTS OF THE INVENTION

The present invention is directed to solving these problems, and an object of the invention is to provide a multifunction device which, while having a pressure feed roller opposite the scanner position for conveying a sheet while pressing the sheet against the scanner, avoids the sheet being caught by the pressure feed roller and can thereby prevent jams and skips in the feed pitch.

A further object of the invention is to provide a scanner apparatus which, while having a pressure feed roller opposite the scanner position for conveying a sheet while pressing the sheet to the scanner, can automatically retract the feed roller from the scanner based on the feed roller drive load and thereby eliminates such problems as damage to the drive source and transfer gears, skipping of the stepping motor, and abnormal undesirable noises resulting from an increase in the drive load when the feed roller directly contacts the scanning glass surface.

SUMMARY OF THE INVENTION

To achieve these objects, a multifunction device according to the present invention has a transportation path for guiding a sheet; a print head positioned along the transportation path for printing on the sheet; a scanner head positioned along the transportation path for scanning the printed side of the sheet; a pressure feed roller positioned opposite the scanner head for transporting the sheet while pressing the sheet against the scanner head; and a roller retraction mechanism for retracting the pressure feed roller from the scanner head and opening the transportation path.

The trailing end part of the sheet that is ejected by the pressure feed roller is preferably held within the vertical part the transportation path downstream from the pressure feed roller. Because the ejected sheet is thus held using the transportation path itself on the downstream side of the pressure feed roller, the number of parts can be reduced and the construction simplified compared with configurations having a special form holding member.

Further preferably, a focusing position of the scanner is offset to the upstream transportation side or downstream transportation side from a position of the scanner head that contacts the pressure feed roller. Pressure from the pressure feed rollers is thus prevented from being applied directly to the focusing position of the scanner head. This reduces the likelihood of ink being transferred and adhering to the focusing position in the scanning process after printing, and prevents as much as possible loss of quality in the scanned image due to such ink. In addition, if the offset is to the downstream side, the scannable area at the leading edge side of the sheet can be increased.

Yet further preferably, the roller retraction mechanism comprises a roller support shaft for supporting the pressure feed roller; a rotating member for advancing and retracting the roller support shaft toward and away from the scanner head; an urging member for urging the rotating member toward the scanner head; a solenoid for retracting the rotating member against the urging force of the urging member; and a drive mechanism positioned near the rotating member for driving the pressure feed roller. By thus supporting the pressure feed roller so the rollers can be freely advanced and retracted by the pivoting rotating member, the roller retraction mechanism can be compactly constructed, the rollers can be smoothly advanced and retracted, and drive power can be reliably transferred to the pressure feed roller because the drive mechanism for driving the pressure feed roller is positioned near the rotating member.

Yet further preferably, the rotating member is positioned between the pair of pressure feed rollers supported on the roller support shaft. The pair of pressure feed rollers is thus substantially uniformly urged, preventing form feeding problems due to differences in roller pressure. The transportation path can also be reliably opened because when the rollers are retracted both pressure feed rollers move in parallel.

Yet further preferably, the pressure feed roller and roller retraction mechanism are positioned in a scanner feed unit that is separate from the scanner head, and the complete scanner feed unit can be retracted from the scanner head. A wide space between the scanner head and pressure feed roller can thus be opened by retracting the entire scanner feed unit, making it easy to remove paper jams in the scanning area and making it easy to clean the surface of the scanner head.

Yet further preferably, a platen is positioned in the scanner feed unit opposite the print head. A wide space is thus also opened between the print head and platen in conjunction with retracting the scanner feed unit, making it easy to remove paper jams in the printing area.

Yet further preferably one of the feed roller pair disposed upstream of the scanner head is also included in the scanner feed unit. A wide space is thus also opened between the feed roller pair in conjunction with retracting the scanner feed unit, making it easy to remove paper jams in the feed rollers.

Further achieving the above objects, a scanner apparatus according to the present invention has a transportation path for guiding a sheet; a scanner head positioned along the transportation path for scanning one side of the sheet; a pressure feed roller positioned opposite the scanner head for transporting the sheet; a rotating member supporting the pressure feed roller and enabling the pressure feed roller to be advanced toward and retracted from the scanner head; an urging member for urging the rotating member toward the scanner head; and a roller drive mechanism for transferring drive power to the pressure feed roller. The roller drive mechanism moves the rotating member in the retraction direction according to a driving load applied to the pressure feed roller.

Preferably, the roller drive mechanism has a motor; a feed roller gear rotating integrally with the pressure feed roller; a sun gear rotated by drive source power of the motor; and a planetary gear freely rotationally supported on the rotating member and engaged with the feed roller gear and sun gear. The roller drive mechanism can thus be configured with the fewest parts, thereby contributing to a reduced part count and a simplified configuration.

Yet further preferably, the scanner apparatus comprises an upstream-side feed roller positioned on the upstream-side of the pressure feed roller. The pressure feed roller being driven with a peripheral velocity higher than the upstream-side feed roller. This applies appropriate tension to the sheet and prevents jams and scanning errors due to slackness in the sheet. Furthermore, problems such as applying excessive tension to the sheet or the drive source being overloaded are also prevented because the drive load of the scanner feed roller is controlled automatically by the roller drive mechanism.

Yet further preferably, at least one pair of the pressure feed rollers is supported on a feed roller support shaft, and the rotating member is positioned between the pair of pressure feed rollers. The pair of pressure feed rollers can thus be advanced and retracted substantially in parallel, and problems such as skewing the sheet due to variations in the form transportation force can be avoided.

Yet further preferably, the rotating member comprises a paper presser guide for aligning the sheet with the scanning surface of the scanner head. Floating or drifting of the sheet between the pair of pressure feed rollers is thus restricted and scanning accuracy can be improved.

Yet further preferably, the scanner apparatus also has a solenoid for forcibly rotating the rotating member in the retraction direction so that space between the pressure feed roller and scanner head opens and closes according to solenoid drive. The sheet can therefore be prevented from catching in the pressure feed roller by driving the pressure feed roller solenoid to open the transportation path when a sheet is advanced between the pressure feed roller and scanner head. The total part count can also be reduced and the configuration simplified because the transportation path can be opened and closed using the mechanism (including the rotating member) for retracting the feed rollers according to the drive load.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Figure 1:
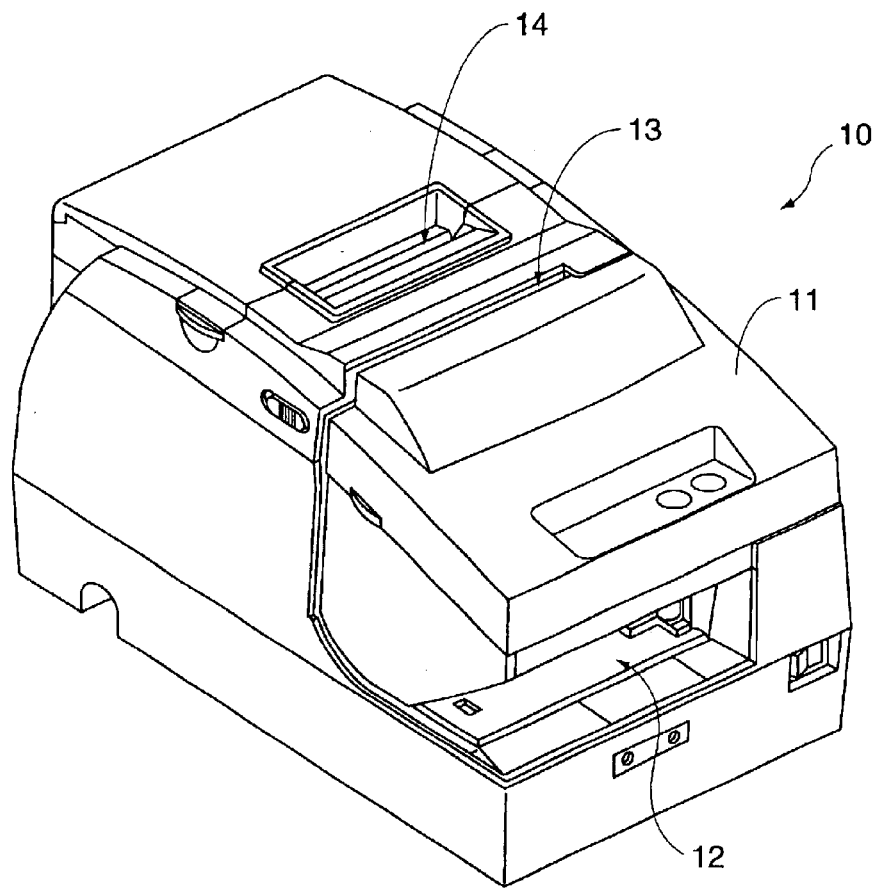
FIG. 1 is an oblique view of a multifunction device according to a preferred embodiment of the invention.

Preferred embodiments of the present invention are described below with reference to the accompanying figures. FIG. 1 is an oblique view of a multifunction device according to a preferred embodiment of the invention.

Figure 3:
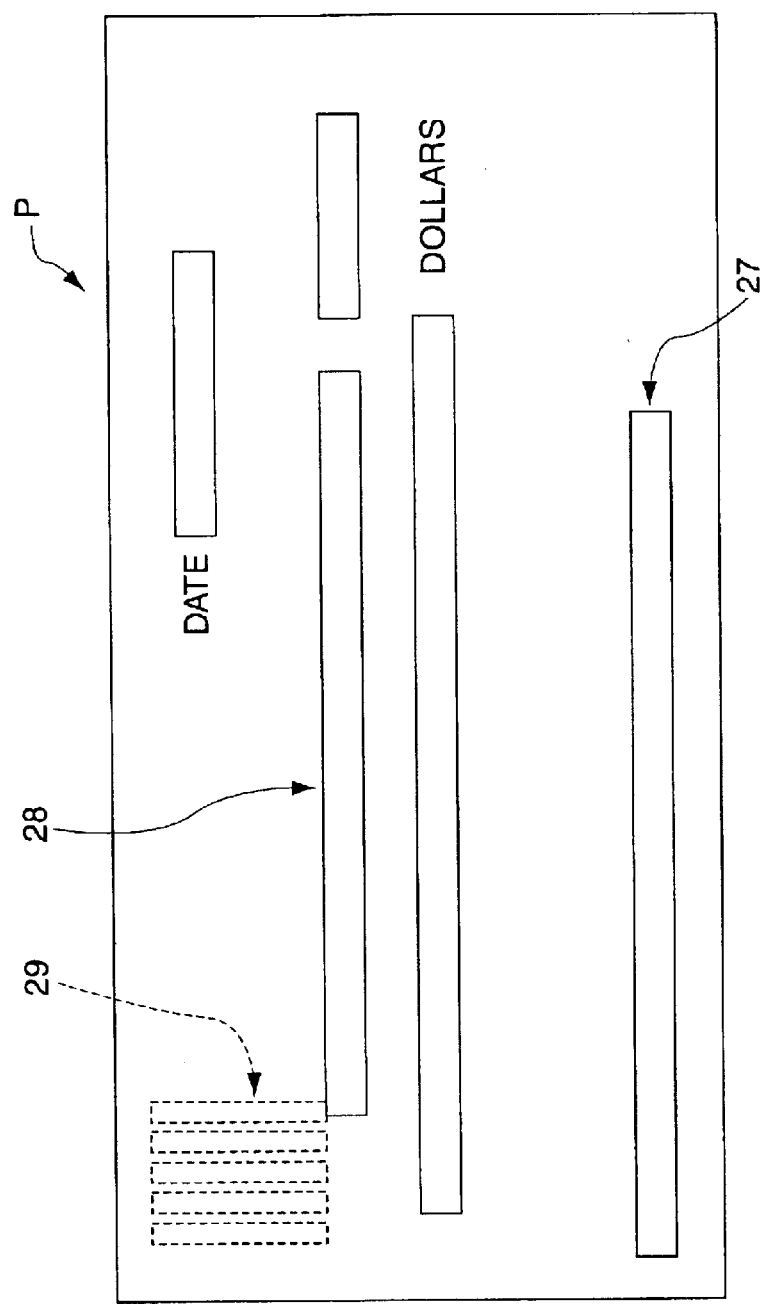
FIG. 3 is a schematic view of a typical check.

As shown in FIG. 1 this multifunction device 10 is covered by a plastic cover 11 having an insertion opening 12 formed at the front for manually inserting a check P (FIG. 3)

or other sheet, and an exit opening 13 formed on top for ejecting the check P. This multifunction device 10 also has a roll paper housing (not shown in the figure) at the back for storing roll paper. Paper is transported through the printing unit from the roll in the roll paper housing, and is pulled out from a roll paper exit 14 formed on top of the multifunction device 10.

Figure 2:
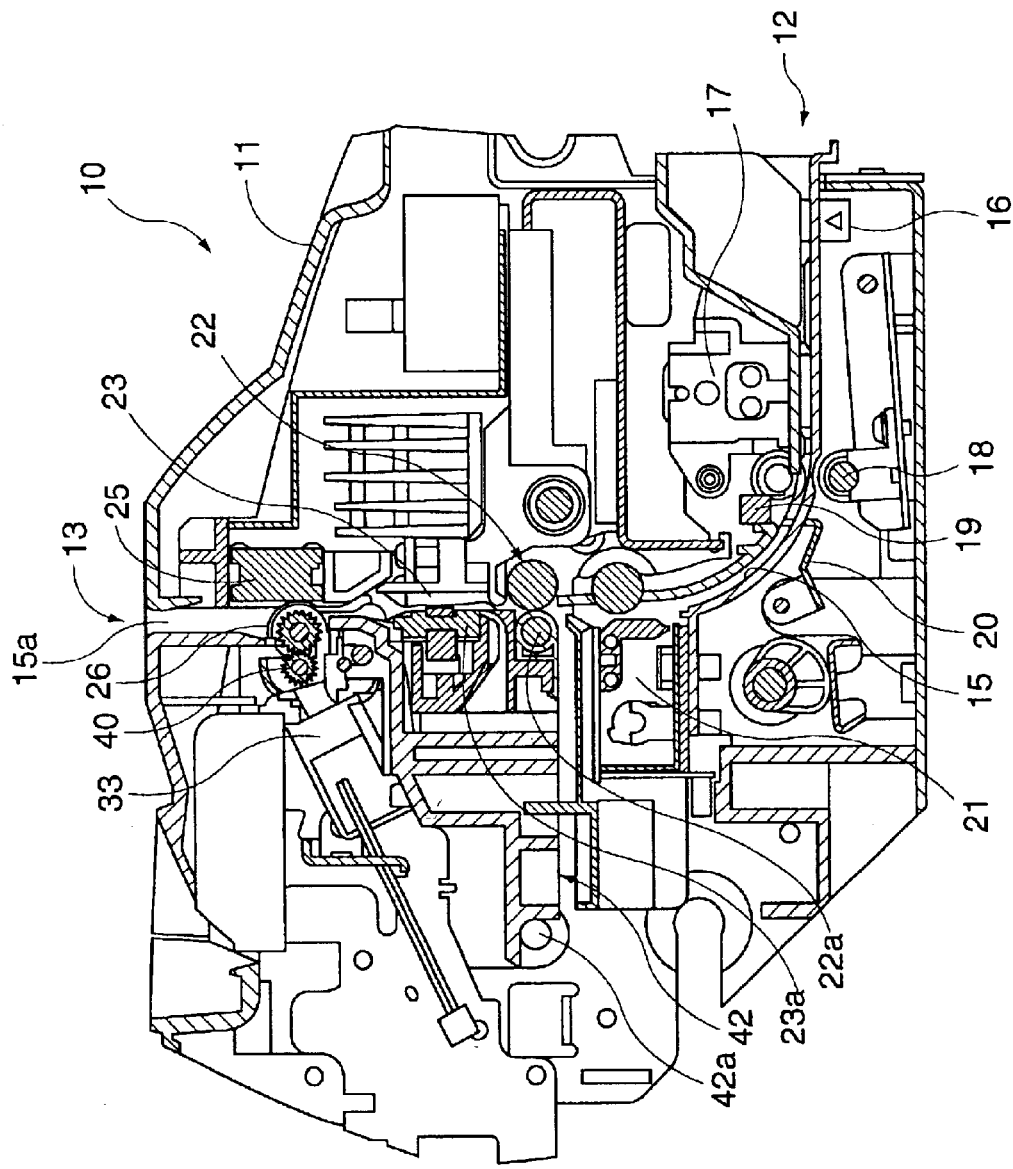
FIG. 2 is a side section view showing the internal structure of the multifunction device.

FIG. 2 is a side section view showing the internal structure of the multifunction device. As shown in FIG. 2 a check P transportation path 15, formed inside the multifunction device 10, extends from insertion opening 12 to exit opening 13. The transportation path 15 bends in an L-shape as seen in a side view from the horizontally oriented insertion opening 12 to the vertically oriented exit opening 13. Disposed along the transportation path 15 in order from the insertion opening 12 side are form trailing edge detector 16, MICR head (magnetic head) 17, first feed roller pair 18, form leading edge detector 19, form positioning member 20, back print head (second print head) 21, second feed roller pair 22, front print head (first print head) 23, paper exit detector 24 (FIG. 14), and scanner head 25. Opposite the scanner head 25 are scanner feed rollers (pressure feed rollers) 26.

The trailing edge detector 16, leading edge detector 19, and paper exit detector 24 are, for example, light transmitting or reflecting type photodetectors enabling non-contact detection of the check P at respective points along the transportation path 15. The form positioning member 20 stops a check P inserted from the insertion opening 12 at a specific position, and can be moved using a solenoid or other actuator type drive source so that the form positioning member 20 projects into and blocks the transportation path 15, or is retracted from and opens the transportation path 15.

The first feed roller pair 18 and second feed roller pair 22 each have a pair of rollers disposed on opposing sides of the transportation path 15 such that the rollers can be appropriately driven to transport the check P in forward or reverse direction. One roller in each pair can also be freely moved to or away from the opposing roller by driving a solenoid or other actuator to open and close the transportation path 15 by advancing or retracting the rollers.

The MICR head 17 reads magnetic ink characters printed on the front of the check P, and validity of the check P is determined based on the data read by the MICR head 17. MICR text is recorded in a specific MICR recording area 27 on the front of the check P as shown in FIG. 3, and includes such information as the account number against which the check P is drawn. Opposite the MICR head 17 is a pressure member 17a (FIG. 14) for pressing a check P against the MICR head 17 during MICR reading. This pressure member 17a is normally retracted from the MICR head 17 so that the transportation path 15 is open.

The front print head 23 is used to print the payee, date, check amount, and other check face information on the front of the check P. This check face information is printed on a front printing area 28 as shown in FIG. 3. The front print head 23 is preferably a serial print head supported on a carriage for dot matrix printing one or multiple rows as the front print head 23 moves widthwise across the front the check. This embodiment of the invention uses a dot impact type print head for transferring ink from an ink ribbon to the check P as the front print head 23, but it will be evident that other types of print heads could be alternatively used.

The back print head 21 is used to print a customer verification number, date, check amount, and other information needed by the store on the back of the check P. This information is printed on the back in an endorsement printing area 29 such as shown in FIG. 3 in phantom. The back print head 21 is preferably a shuttle print head with plural heads arrayed widthwise to the check P with a specific gap therebetween, and prints a dot matrix one or plural rows at a time by head movement within this gap width. It will be further noted that while this embodiment uses a dot impact print head to transfer ink from an ink ribbon to the check P as the back print head 21, other types of print heads could be used.

Figure 4:
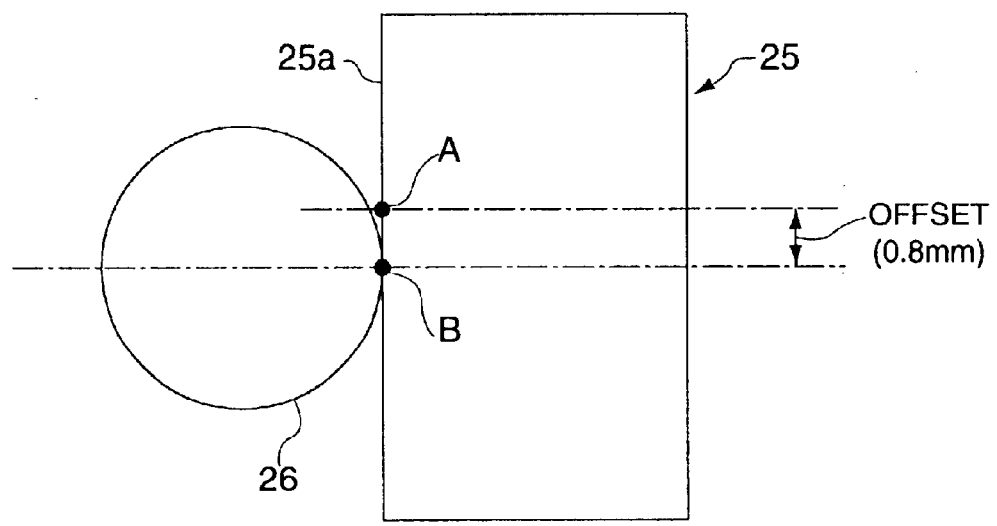
FIG. 4 is a side view of the scanner and scanner feed rollers.

The scanner head 25 is for scanning the surface of the printed check P. The scanned image data is then compressed and sent to and stored in a host computer, and used for electronic settlements. This embodiment of the invention uses a contact image sensor (CIS) for the scanner head 25 to scan checks P placed on the scanning glass 25a (FIG. 4).

The scanner feed roller 26 transports the check P for scanning, pressing the check P against the scanning glass 25a of scanner head 25 while transporting the check P to the exit opening 13 side. As shown in FIG. 4, this scanner feed roller 26 presses the check P against the scanning glass 25a at a position offset slightly from the scanner focusing position A rather than directly at the scanner focusing position A. More specifically, scanner focusing position A is offset either upstream or downstream along the transportation path relative to the scanner contact position B of the scanner feed roller 26. In this embodiment scanner focusing position A is offset 0.8 mm to the downstream side (the exit opening 13 side) from scanner contact position B of scanner feed roller 26. Applying pressure from the scanner feed roller 26 directly to the scanner glass at the focusing position A is thus avoided.

It is therefore possible to reduce the likelihood of transferring ink onto the glass at scanner focusing position A when scanning a check P immediately after printing. This prevents a reduction in scanned image quality that can occur when ink adheres to the glass at the focusing position.

Furthermore, the largest possible scanable area can be assured at the leading edge of the check P because the scanner focusing position A is offset to the downstream side from the scanner contact position B of scanner feed roller 26. It should be noted that if the scanner focusing position A is greatly offset from the scanner contact position B of scanner feed roller 26, the check P could drift away from the scanning glass 25a at scanner focusing position A. The offset in the present embodiment is only 0.8 mm, however. Separation of the check P from the scanning glass 25a is therefore held to 0.2 mm or less, and there is no danger of a drop in scanned image quality.

During scanner operation the scanner feed roller 26 conveys the check P upward so that the check P is ejected from exit opening 13. The trailing edge of the ejected check P is held at this time in the transportation path 15 on the downstream side of the scanner feed roller 26. More specifically, the exit end of the transportation path 15 (the part between scanner feed roller 26 and exit opening 13) is vertically oriented with a length of approximately L/6 (where L is the length of check P) so that the ejected check P can be held and will not fall out of the multifunction device 10.

Figure 5:
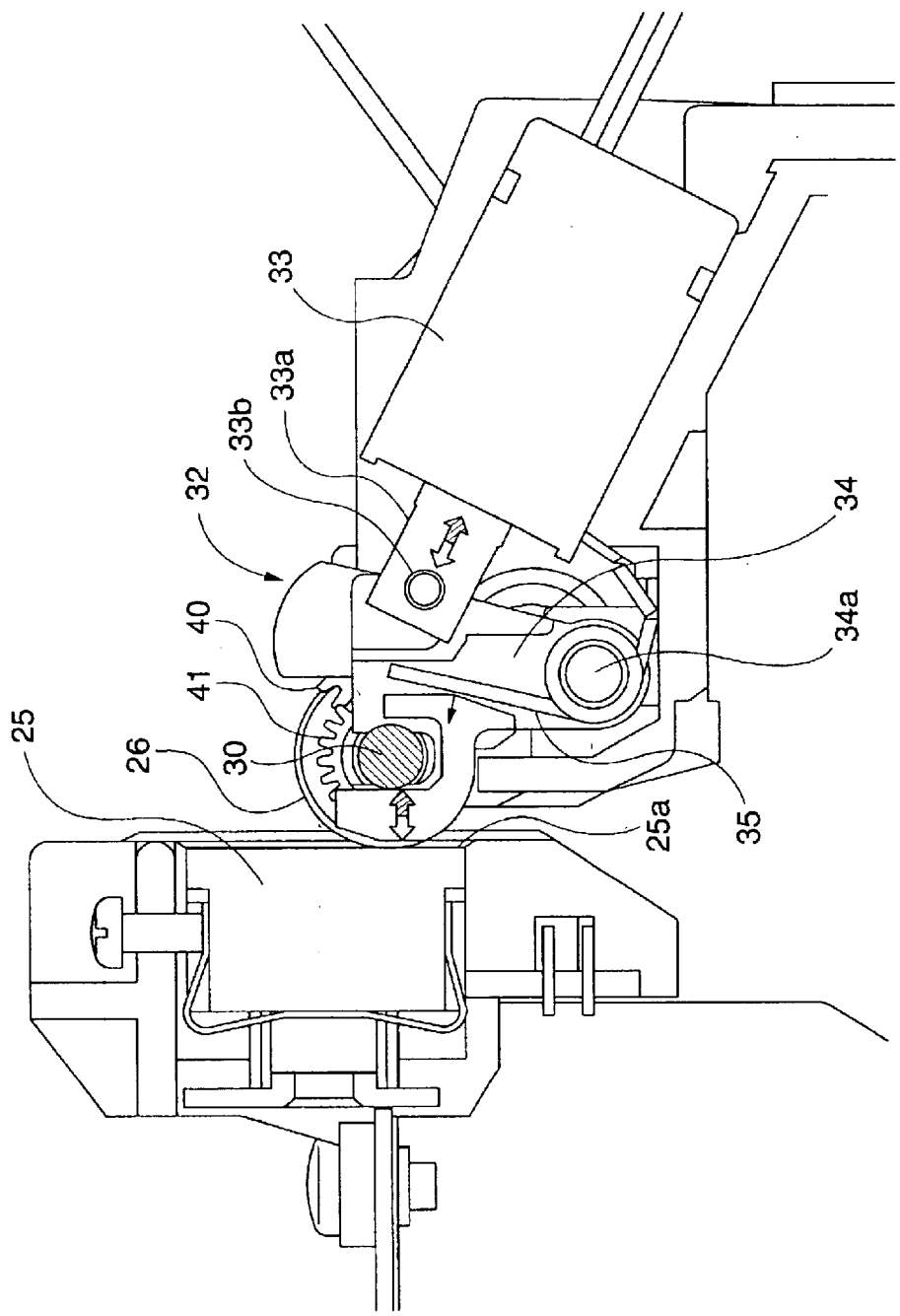
FIG. 5 is a side view of the roller retraction mechanism.
Figure 6:
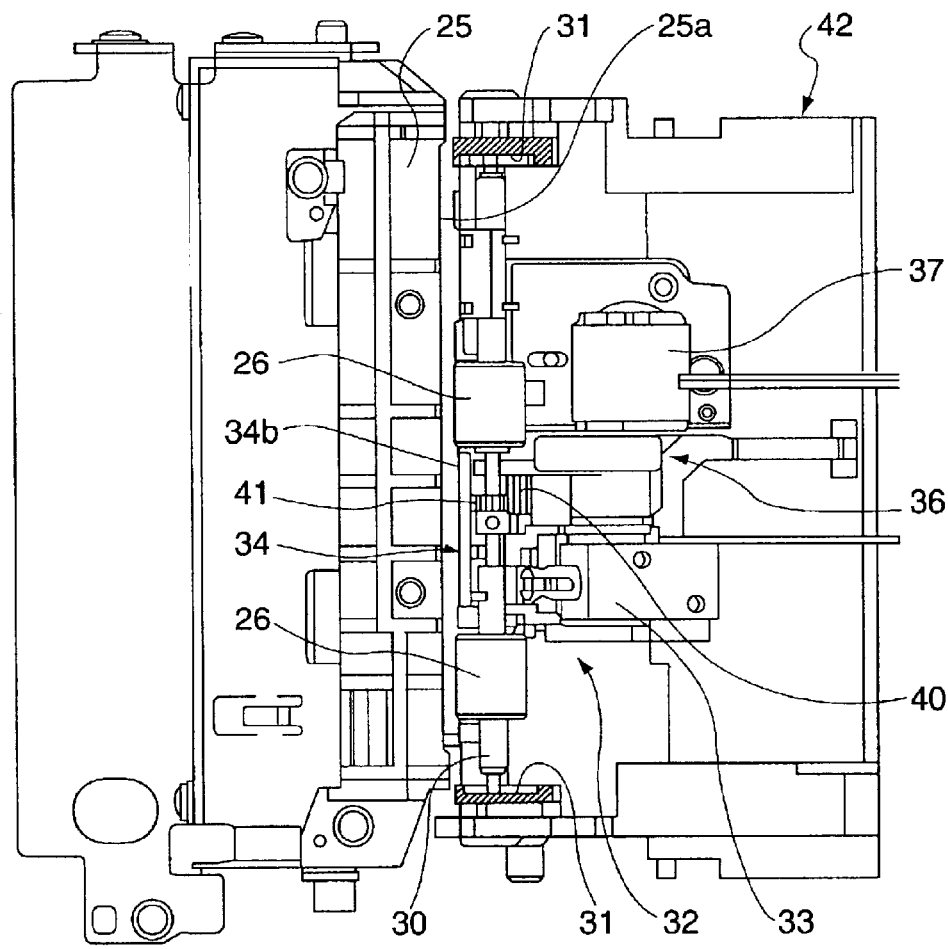
FIG. 6 is a plan view of the roller retraction mechanism.

FIG. 5 is a side view of the roller retraction mechanism and FIG. 6 is a plan view of the roller retraction mechanism. As shown in these figures a pair of scanner feed rollers 26 is disposed with a specific gap therebetween on a roller support shaft 30. The roller support shaft 30 is supported in the middle by a roller retraction mechanism 32 and the ends of the roller support shaft 30 are guided in a guide channel 31 so as to move freely forward and back toward and away from the scanner head 25. The roller retraction mechanism 32 is configured to pull the roller support shaft 30 back when driven by the scanner feed roller solenoid 33, thereby retracting the scanner feed rollers 26 from the scanner head 25 and opening the transportation path 15. In other words, when not scanning, the scanner feed rollers 26 are in the retracted position so that the end of the check P does not get caught by the scanner feed rollers 26. Furthermore, after the check P is advanced to the scanning start position by the first feed roller pair 18 and second feed roller pair 22 for the scanning operation, the scanner feed rollers 26 are released from the retracted position to press the check P against the scanner head 25 and are then driven to advance the check P.

The roller retraction mechanism 32 has a pressure lever (rotating member) 34 rotatably supporting and advancing or retracting the roller support shaft 30 toward or away from the scanner head 25, a presser spring (urging member) 35 for urging the pressure lever 34 toward the scanner head 25, and a scanner feed roller solenoid 33 for retracting the pressure lever 34 against the urging force of the presser spring 35. The pressure lever 34 is a rotating member that can turn freely forward and back about a rotating support shaft 34a, and rotationally supports the roller support shaft 30 between the pair of right and left scanner feed rollers 26. As a result, not only can the pair of scanner feed rollers 26 be advanced and retracted substantially parallel to the scanner head 25, substantially uniform pressure can be applied by a single presser spring 35, and problems such as the check P becoming skewed due to differences in transportation force can be avoided. Moreover, the pair of scanner feed rollers 26 can be held substantially parallel while being retracted, and the transportation path 15 can be reliably opened.

Furthermore, a paper presser guide 34b for aligning the check P with the scanning glass 25a of the scanner head 25 is also integrally formed with the front end of the pressure lever 34 to control drifting of the check P between the right and left scanner feed rollers 26.

The scanner feed roller solenoid 33 has a drive shaft 33a that pulls into the solenoid body when current is applied. A pin 33b passes laterally (right-left) through the end of the drive shaft 33a. The right and left ends of the pin 33b are fit loosely in a pair of right and left channels 34c (FIG. 8) formed vertically (up and down) in the pressure lever 34, thereby smoothly linking linear movement of the drive shaft 33a and the circular or rotational movement of the pressure lever 34.

Figure 7:
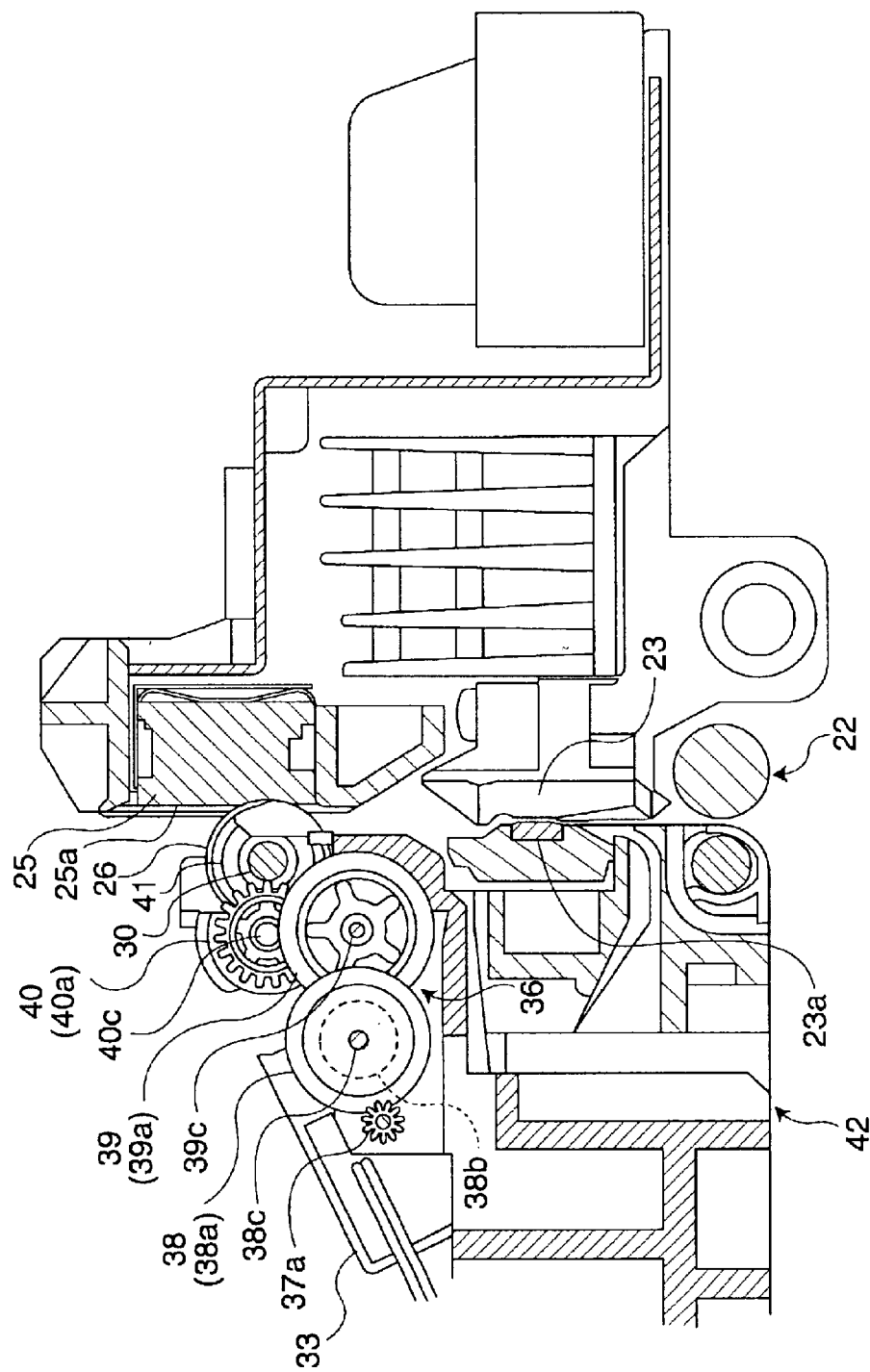
FIG. 7 is a side section view showing essential parts of the roller drive mechanism.
Figure 8:
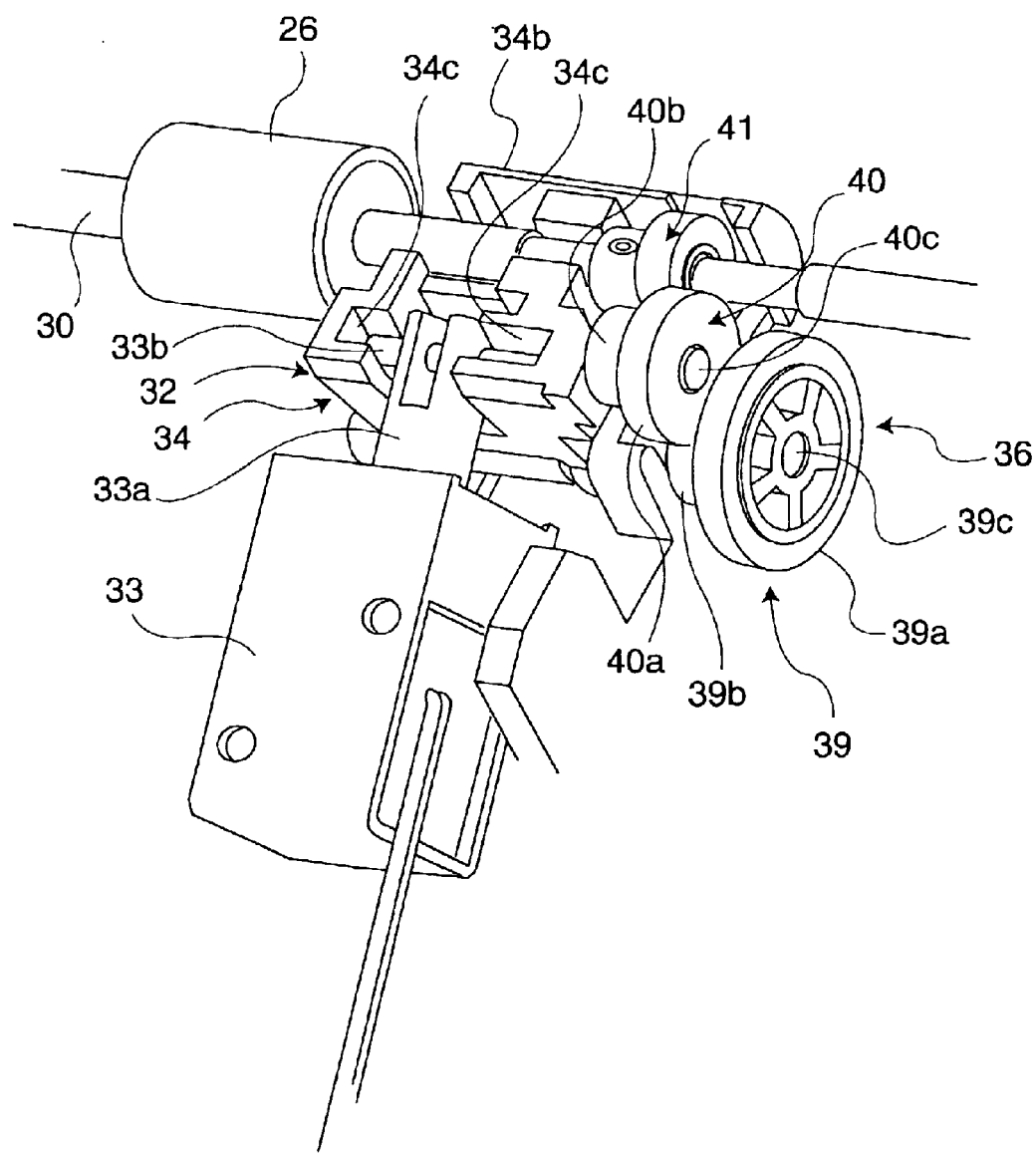
FIG. 8 is an oblique view showing the roller drive mechanism in a normal state.
Figure 9:
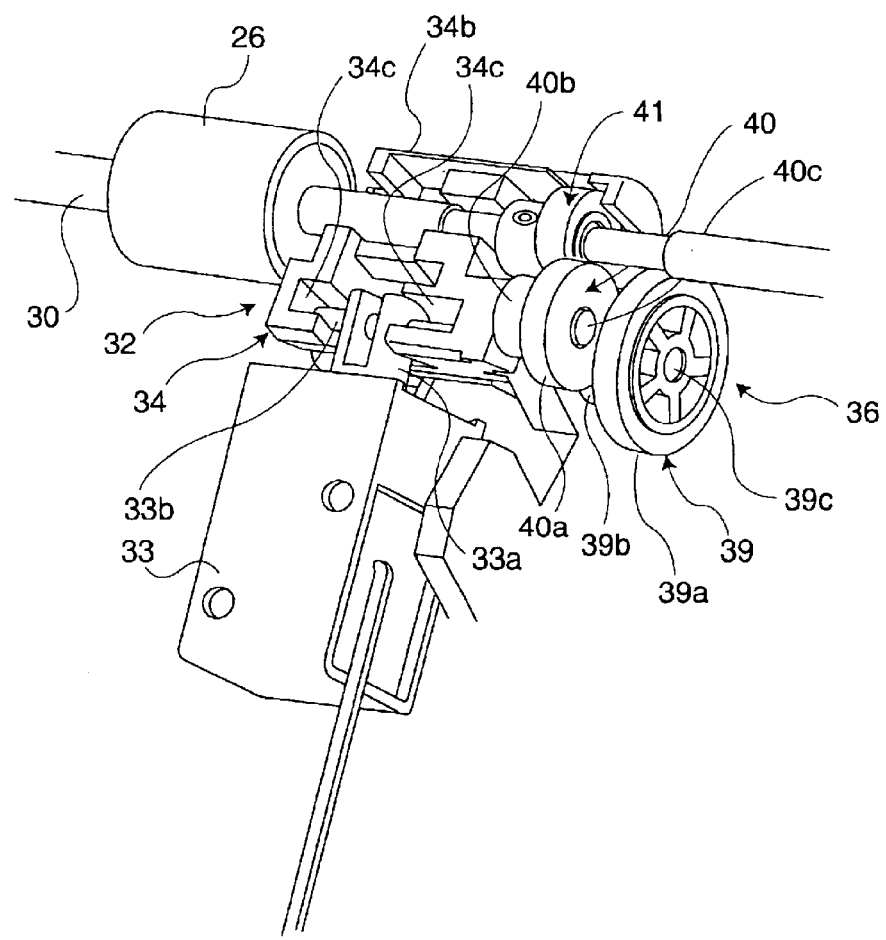
FIG. 9 is an oblique view showing the roller drive mechanism when the pressure lever is retracted.

A drive system for driving the scanner feed rollers 26 is also positioned near the roller retraction mechanism 32. FIG. 7 is a side section view showing essential parts of the roller drive mechanism; FIG. 8 is an oblique view showing the roller drive mechanism in a normal state; and FIG. 9 is an oblique view showing the roller drive mechanism when the pressure lever is retracted.

As shown in these figures, the scanner feed rollers 26 are driven by roller drive mechanism 36. The roller drive mechanism 36 has a scanner feed motor 37 (FIG. 6), middle gear 38, sun gear 39, planetary gear 40, and feed roller gear 41. The feed roller gear 41 is formed integrally with the roller support shaft 30 and positioned between the pair of scanner feed rollers 26.

The scanner feed motor 37 is a stepping motor positioned in the scanner feed unit 42, described further below. A roller drive force transfer path is thus positioned near the support part of the roller support shaft 30, and drive power can be reliably transferred to the scanner feed rollers 26. Furthermore, by locating the presser spring 35, which applies pressure to the roller support shaft 30, near the location where drive power is transferred to the roller support shaft 30 (the location of feed roller gear 41), the scanner feed rollers 26 can be driven without disturbing the pressure balance.

The middle gear 38 has an integral first gear part 38a and second gear part 38b, and is supported in scanner feed unit 42 by intervening gear shaft 38c. The first gear part 38a meshes with pinion gear 37a of scanner feed motor 37, and second gear part 38b meshes with the first gear part 39a of sun gear 39.

The sun gear 39 has a first gear part 39a meshing with second gear part 38b of the middle gear 38, and a second gear part 39b meshing with the first gear part 40a of the planetary gear 40. The sun gear 39 is supported in scanner feed unit 42 by intervening gear shaft 39c.

The planetary gear 40 has a first gear part 40a meshing with second gear part 39b of sun gear 39, and a second gear part 40b meshing with the feed roller gear 41. The planetary gear 40 is supported on pressure lever 34 by intervening gear shaft 40c.

Figure 10:
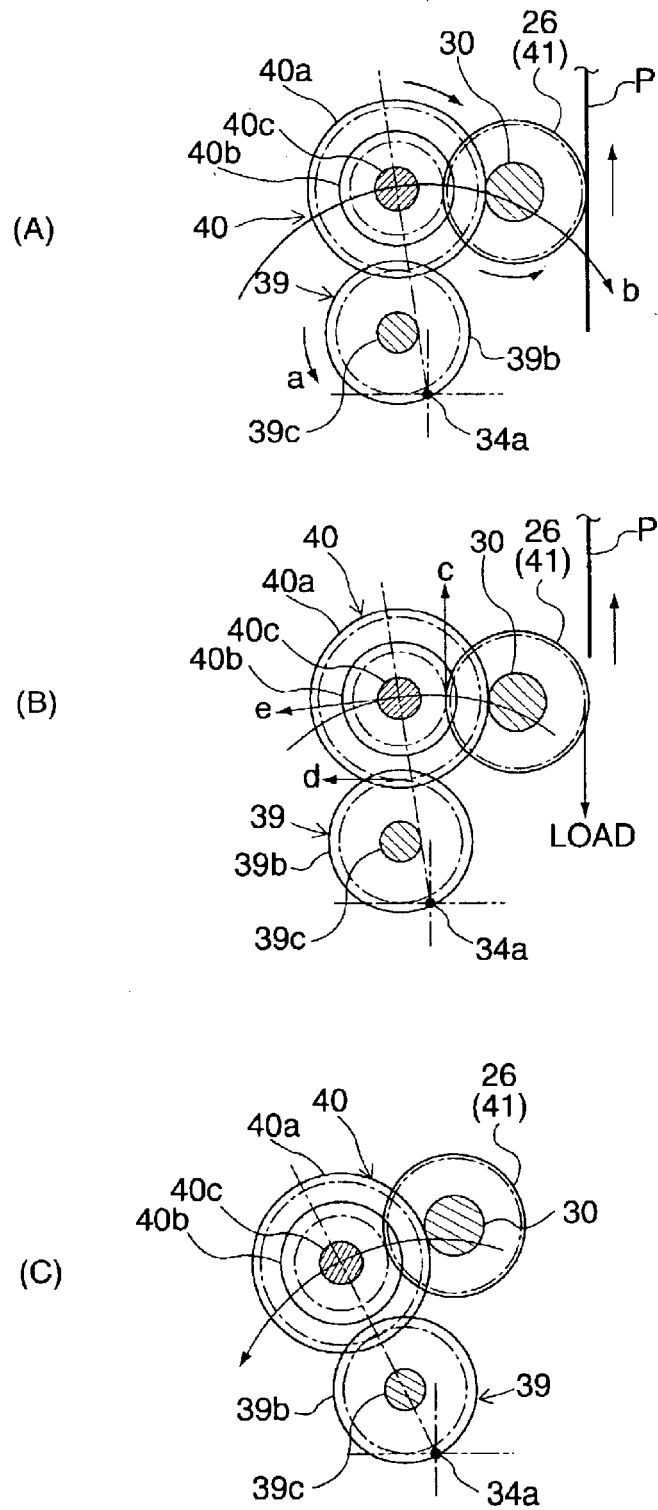
FIGS. 10(*a*), (*b*), and (*c*) depict the action of the roller drive mechanism.

FIGS. 10(a), (b), and (c) illustrate the action of the roller drive mechanism. As shown in these figures, the gear shaft 39c of sun gear 39 is positioned near the rotating support shaft 34a (pivot point) of pressure lever 34. A planetary gear mechanism enabling planetary gear 40 to travel freely around the sun gear 39 is thus formed.

As shown in FIG. 10(a), sun gear 39 turns in the direction of arrow a in conjunction with driving of scanner feed motor 37 during the scanning operation. The scanner feed rollers 26 are urged by presser spring 35 toward the scanner head 25 (in the direction of arrow b), and the check P is transported upward by the drive force transferred by way of sun gear 39, planetary gear 40, and feed roller gear 41. The load on the scanner feed roller 26 is the friction resistance between the check P and scanner head 25 at this time and is therefore relatively low.

As shown in FIG. 10(b), when transportation of the check P is completed and scanner feed roller 26 directly contacts the scanning glass 25a of scanner head 25, the load acting on the scanner feed roller 26 is the friction resistance between the scanner feed roller 26 and scanner head 25, and thus rapidly rises. Reactive force in the direction of arrows c and d acts on the planetary gear 40 at this time, and part of the drive force of sun gear 39 works on the gear shaft 40c of planetary gear 40 as retraction drive force e (i.e., the vector component in the direction of arrow e combining reactive force in the direction of arrow c and reactive force in the direction of arrow d).

When retraction drive force e acts on gear shaft 40c of planetary gear 40 as shown in FIG. 10(c), pressure lever 34 turns in the retraction direction in opposition to the urging force of the presser spring 35, the pressure applied by the scanner feed rollers 26 therefore drops, and the scanner feed roller 26 drive load is thus reduced. Because the scanner feed rollers 26 can thus be automatically retracted from the scanner head 25 according to the drive load of the scanner feed rollers 26, problems such as damage to the transfer gears and scanner feed motor 37 and skipping of the scanner feed motor 37, with resultant undesirable noise due to overloading, can be prevented even if the scanner feed rollers 26 directly contact the scanning glass 25a of scanner head 25 and the drive load increases.

Note that the relationship between the scanner feed roller 26 drive load and the retraction force of the pressure lever 34 can be adjusted by controlling the speed reducing ratio of the sun gear 39, planetary gear 40, and feed roller gear 41.

Figure 17:
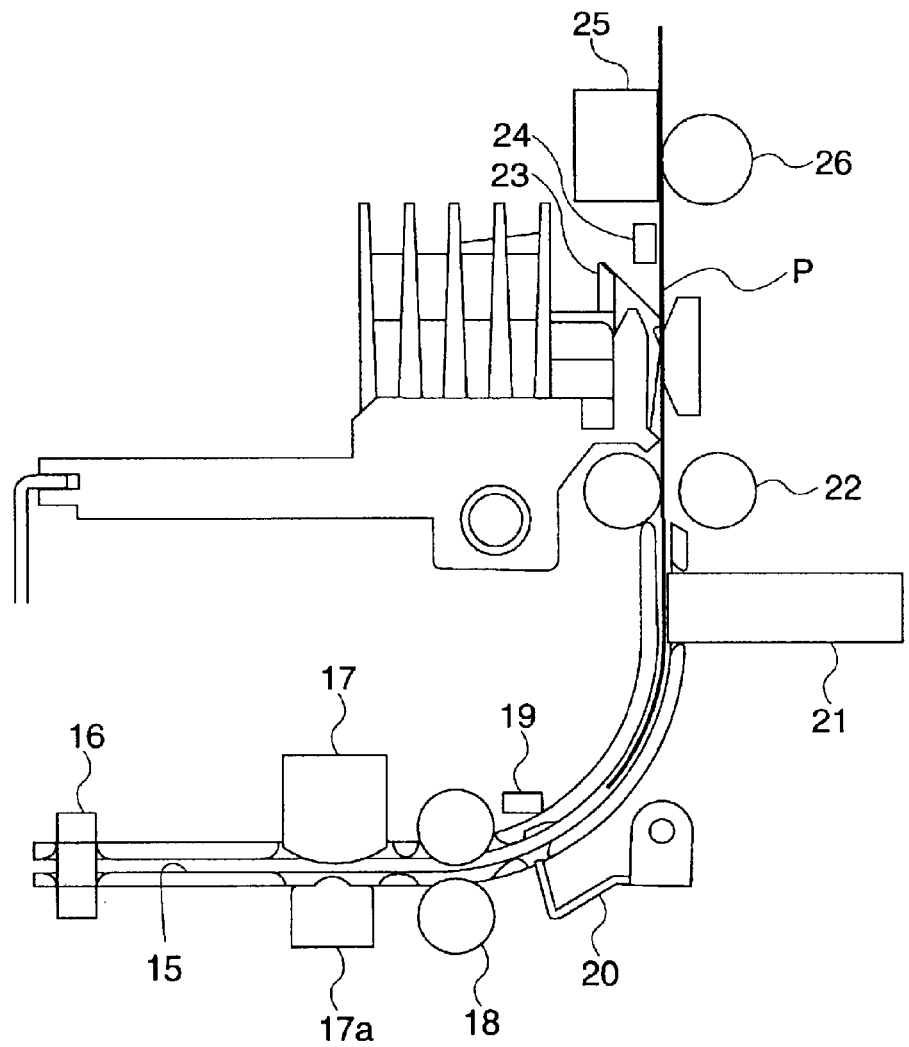
FIG. 17 is an internal side view of the multifunction device during scanning.

In the scanning operation shown in FIG. 17 a check P, fed by the second feed roller pair 22 to the scanner head 25, is held between the scanner head 25 and scanner feed rollers 26 and then transported up by simultaneously driving second feed roller pair 22 and scanner feed rollers 26. The scanner feed rollers 26 are driven at this time so that the peripheral speed of the scanner feed rollers 26 is faster than the second feed roller pair 22. This applies appropriate tension to the check P and prevents jams and scanning errors due to slackness in the check P. Furthermore, problems such as applying excessive tension to the check P or the scanner feed motor 37 being overloaded are also prevented because the drive load of the scanner feed roller 26 is controlled automatically as described above.

It will also be noted that the present embodiment is also configured so that the scanner feed rollers 26 and roller retraction mechanism 32 can be greatly retracted from the scanner head 25. This accommodates the need to clean the scanning glass 25a of scanner head 25 and makes the removal of paper jams between the scanner head 25 and scanner feed rollers 26 easier. This configuration is described next with reference to FIG. 21.

Figure 21:
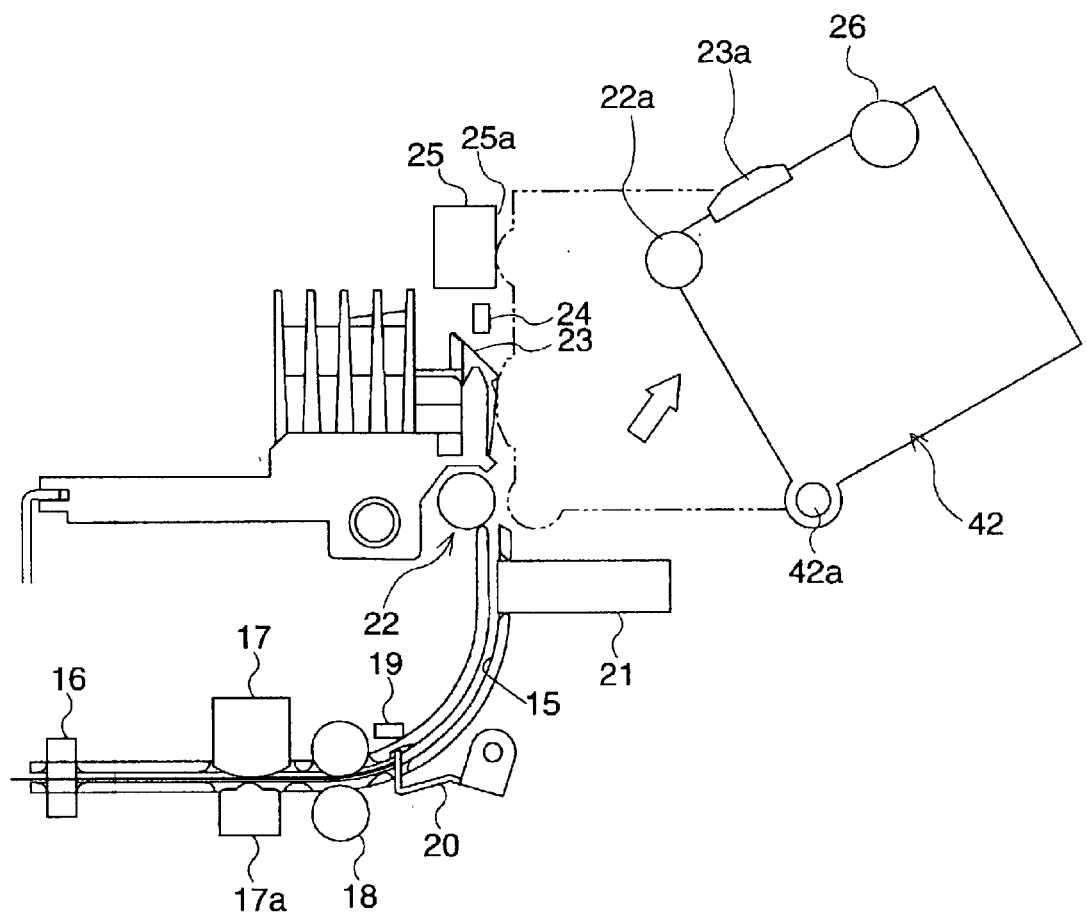
FIG. 21 is an internal side view of the multifunction device showing the scanner feed unit retraction mechanism.

FIG. 21 is a side view of the inside of the multifunction device showing the scanner feed unit retraction mechanism. As shown in FIG. 21 a scanner feed unit 42 separate from the scanner head 25 is positioned opposite the scanner head 25. The scanner feed unit 42 includes the above-described scanner feed rollers 26, roller retraction mechanism 32, and scanner feed motor 37, and is supported freely rotatably inside the multifunction device by intervening unit rotation support shaft 42a.

When the entire scanner feed unit 42 is rotated back and retracted pivoting on the unit rotation support shaft 42a (to a maximum 90° in the present embodiment), the scanner feed rollers 26 and roller retraction mechanism 32 retract greatly from the scanner head 25 so that there is a large gap between the scanner head 25 and scanner feed rollers 26. This makes it easy to remove paper jams in the scanner head 25 and to clean the scanning glass 25a.

A platen 23a disposed opposite the front print head 23 and one roller 22a of the second feed roller pair 22 are disposed at the front of the scanner feed unit 42. This means that when the entire scanner feed unit 42 is rotationally retracted as described above, the platen 23a and roller 22a are also retracted, thereby making it easy to remove paper jams from the front print head 23 and second feed roller pair 22.

Figure 11:
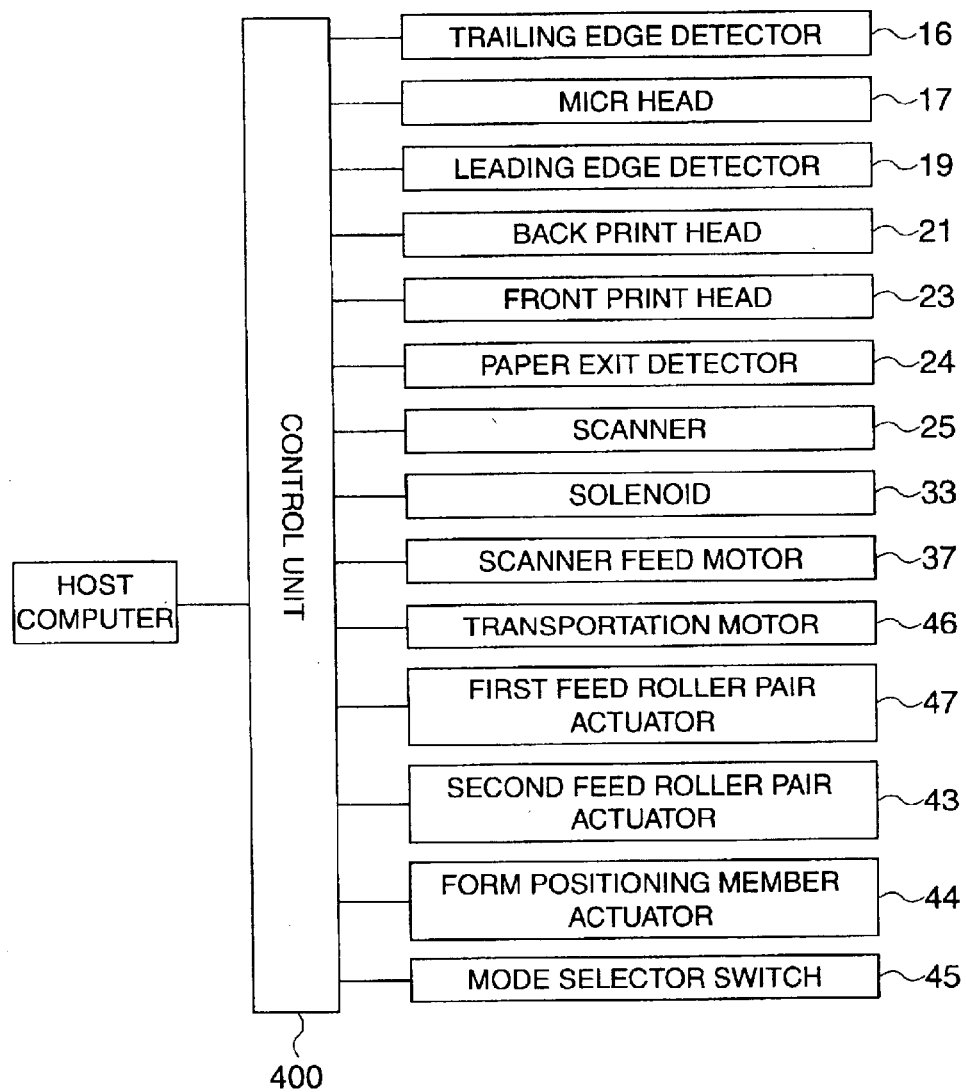
FIG. 11 is a block diagram showing control unit inputs and outputs.

FIG. 11 is a block diagram showing control unit inputs and outputs. As shown in FIG. 11 the multifunction device 10 has a control unit 400 comprising a CPU, ROM, RAM, and other devices. In addition to the above-described trailing edge detector 16, MICR head 17, leading edge detector 19, back print head 21, front print head 23, paper exit detector 24, scanner head 25, scanner feed roller solenoid 33, and scanner feed motor 37, transportation motor 46 for driving the first feed roller pair 18 and second feed roller pair 22, first feed roller pair actuator 47 for opening and closing the first feed roller pair 18, second feed roller pair actuator 43 for opening and closing the second feed roller pair 22, form positioning member actuator 44 for operating the form positioning member 20 to opened and closed positions, and mode selector switch 45 for selecting a first process control mode (with scanning) or a second process control mode (without scanning), are also connected to the control unit 400.

The compound process control sequence run by the control unit 400 for the first process control mode and second process control mode is described next with reference to the accompanying flow charts.

Figure 12:
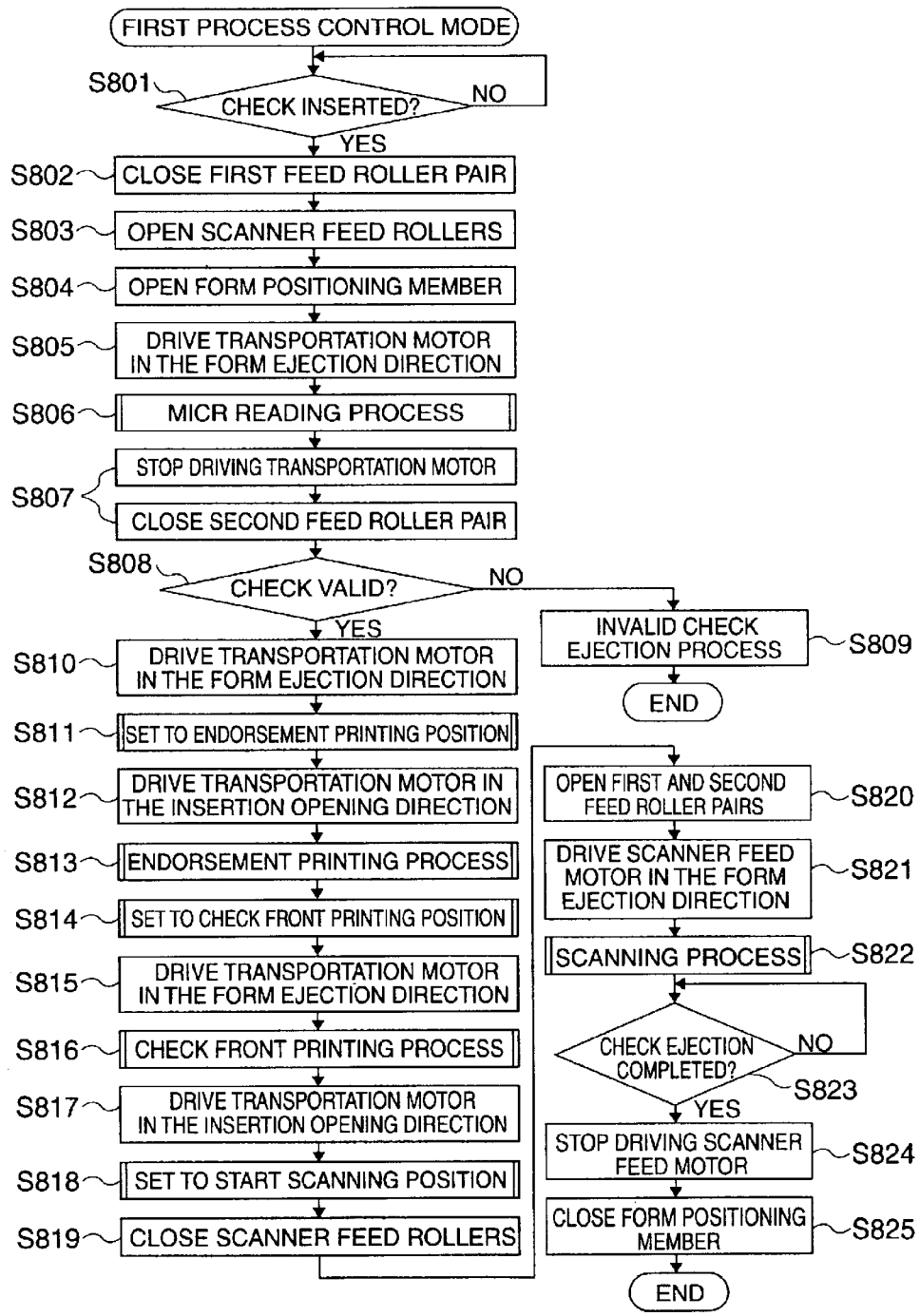
FIG. 12 is a flow chart of the first process control mode.
Figure 13:
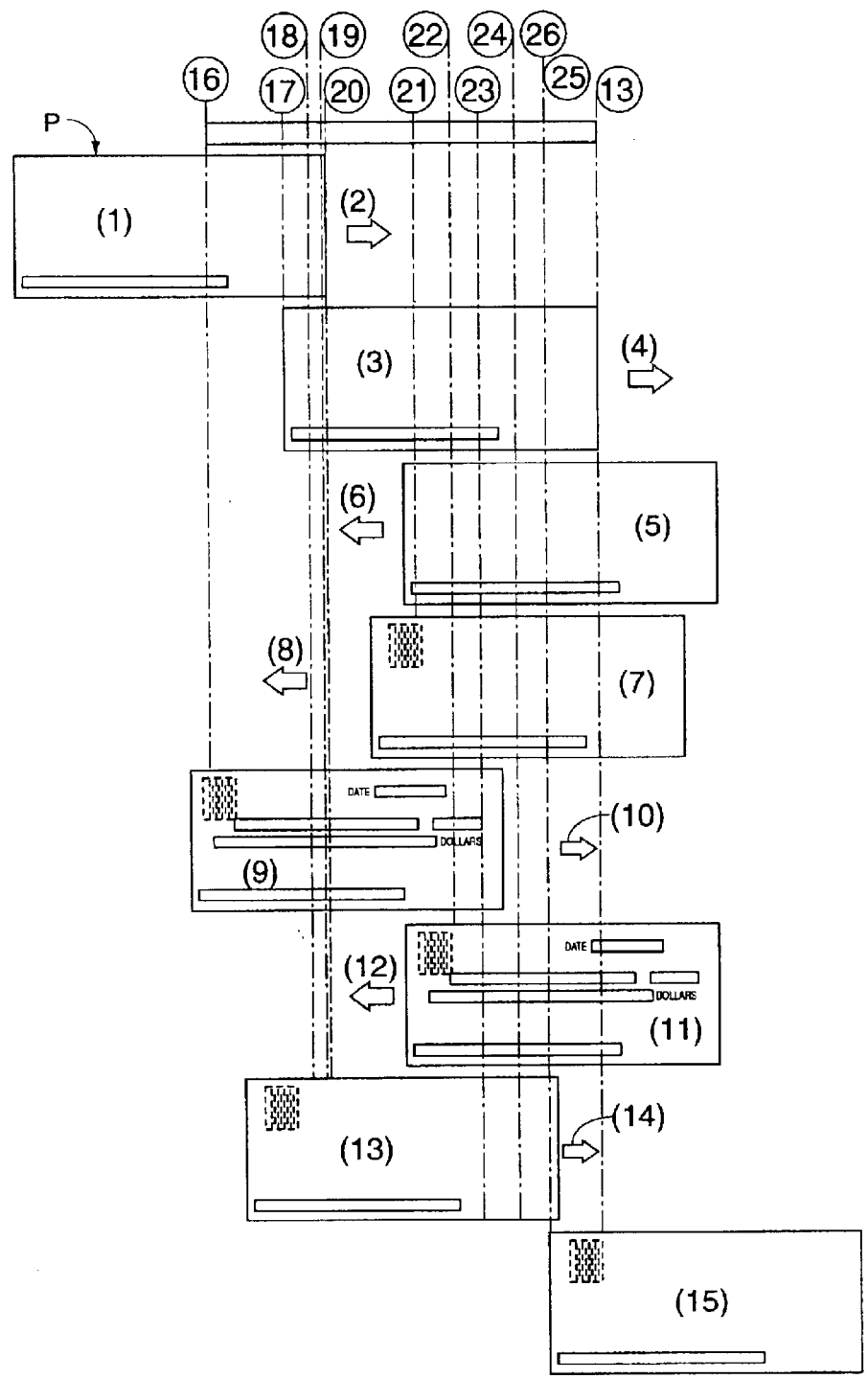
FIG. 13 depicts operation in the first process control mode.
Figure 14:
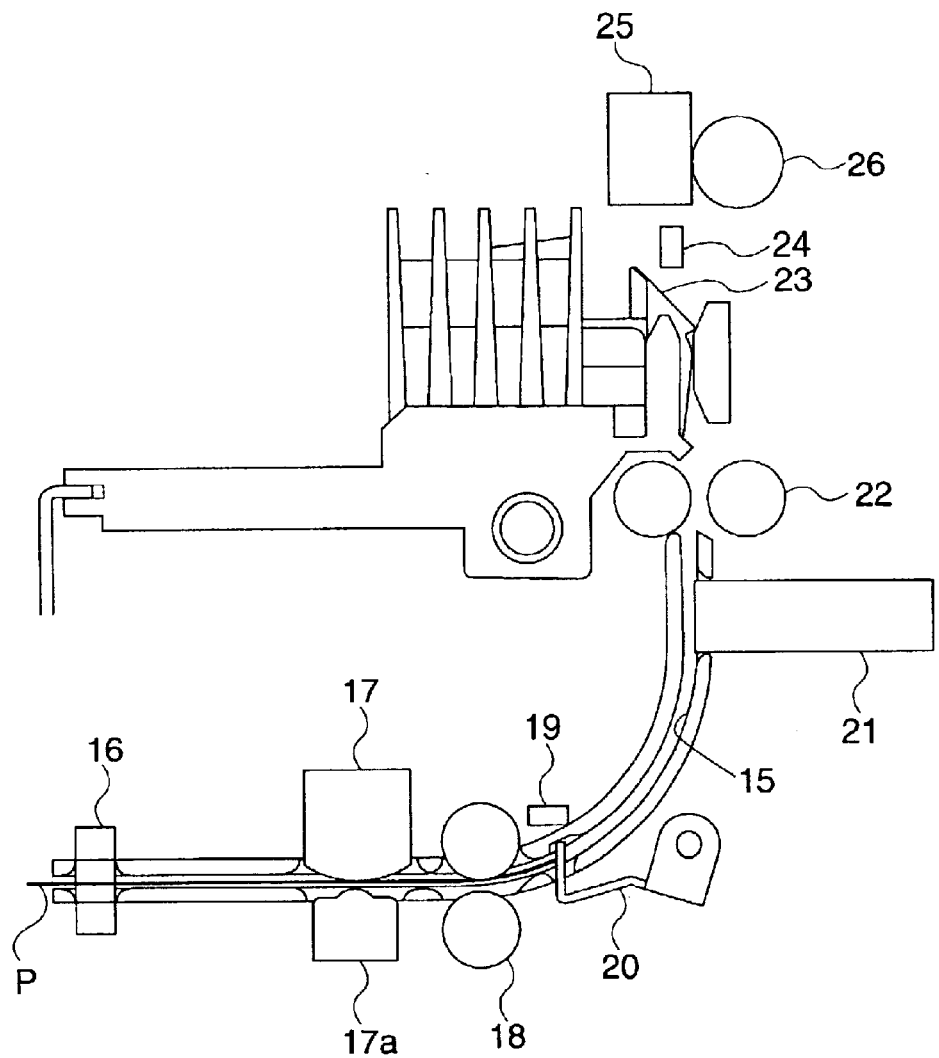
FIG. 14 is an internal side view of the multifunction device during check insertion.
Figure 15:
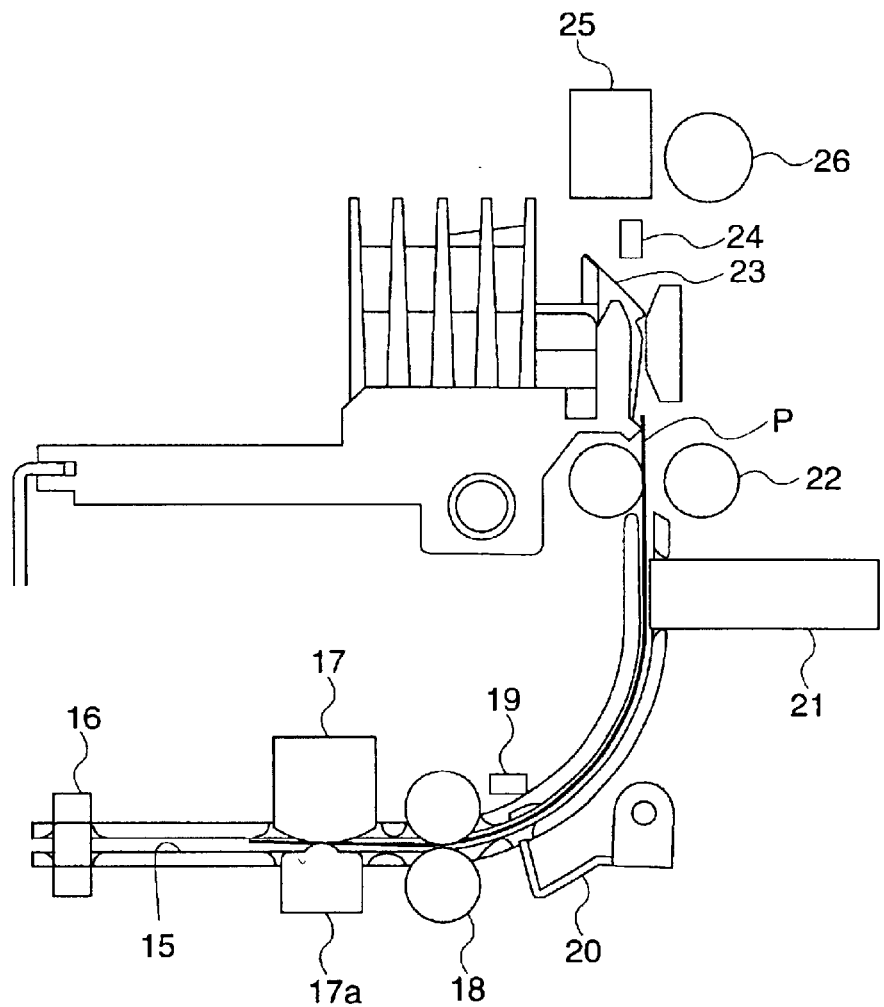
FIG. 15 is an internal side view of the multifunction device during MICR reading.
Figure 16:
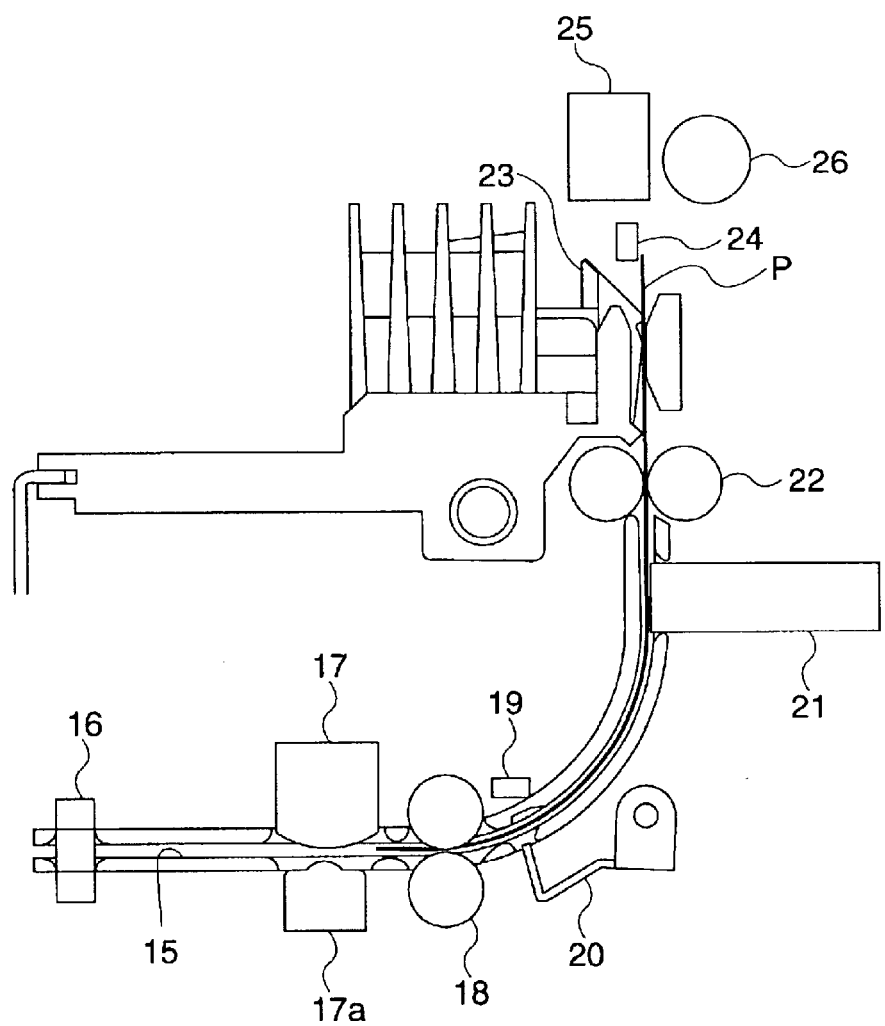
FIG. 16 is an internal side view of the multifunction device when printing.

FIG. 12 is a flow chart of the first process control mode; FIG. 13 illustrates operation in the first process control mode; FIG. 14 is an internal side view of the multifunction device during check P insertion; FIG. 15 is an internal side view of the multifunction device during MICR reading; FIG. 16 is an internal side view of the multifunction device when printing; and FIG. 17 is an internal side view of the multifunction device during scanning.

As shown in the figures, the first step in the first process control mode is to wait for insertion of a check P (S801). During this time the first and second feed roller pairs 18, 22 are held open, and the form positioning member 20 and scanner feed rollers 26 are held closed. Note that if operation was previously in the second process control mode, the scanner feed rollers 26 are open.

When a check P is inserted from insertion opening 12, check P insertion is detected from the detection signals output by trailing edge detector 16 and leading edge detector 19 (FIG. 13(1), FIG. 14). When check P insertion is detected, the first feed roller pair 18 closes (S802), the scanner feed rollers 26 open (S803), and the form positioning member 20 opens (S804). MICR text is then read with the MICR head 17 (S806, FIG. 13(2), (3), FIG. 15) while driving the transportation motor 46 in the form ejection direction (S805). After MICR reading, driving the transportation motor 46 stops (S807) and the second feed roller pair 22 closes. The data read with the MICR head 17 is sent to a host computer for check P verification. When the verification result is received from the host computer the result is evaluated (S808). If the check P is invalid, an invalid check ejection process (S809) is run and the first process control mode ends.

If the check P is valid, the transportation motor 46 is driven in the form ejection direction (S810) to set the check for endorsement printing to the check back (S811, FIG. 13(4), (5), FIG. 16). The check is set to the endorsement printing position and to other various positions noted below by driving the transportation motor 46 a specified number of steps referenced to positions detected by the detectors 16, 19, and 24 (including stopping form transport). When positioning for endorsement printing is completed the transportation motor 46 is driven in the insertion opening 12 direction (S812) while running the endorsement printing process with the back print head 21 (S813, FIG. 13(6), (7)).

When endorsement printing is completed, the check P is set to the front printing position (S814, FIG. 13(8), (9)), and then, while driving the transportation motor 46 in the form ejection direction (S815), the front of the check is printed using the front print head 23 (S816, FIG. 13(10), (11)). When printing the check front is completed the transportation motor 46 is again driven in the insertion opening 12 direction (S817) to set the check P to the start scanning position (S818, FIG. 13(12), (13)), the scanner feed rollers 26 are closed (S819), and the first and second feed roller pairs 18, 22 are opened (S820). The scanning process (S822, FIG. 13(14), FIG. 17) is then run while driving the scanner feed motor 37 in the form ejection direction (S821).

A check ejection decision (S823) is then made after the scanning process ends. If the decision is to eject the check P (FIG. 13(15)), driving the scanner feed motor 37 stops (S824), the form positioning member 20 is closed (S825), and the first process control mode ends.

The ejected check P is prevented from dropping into the transportation path 15 on the upstream side by the scanner feed rollers 26 and is held by the transportation path 15 on the downstream side so that it will not fall out from the multifunction device 10.

It should be noted that by controlling the transportation motor 46 synchronized to the scanner feed speed in the first process control mode, the check P can be transported to the end of the scanning process with the first and second feed roller pairs 18, 22 closed.

Figure 18:
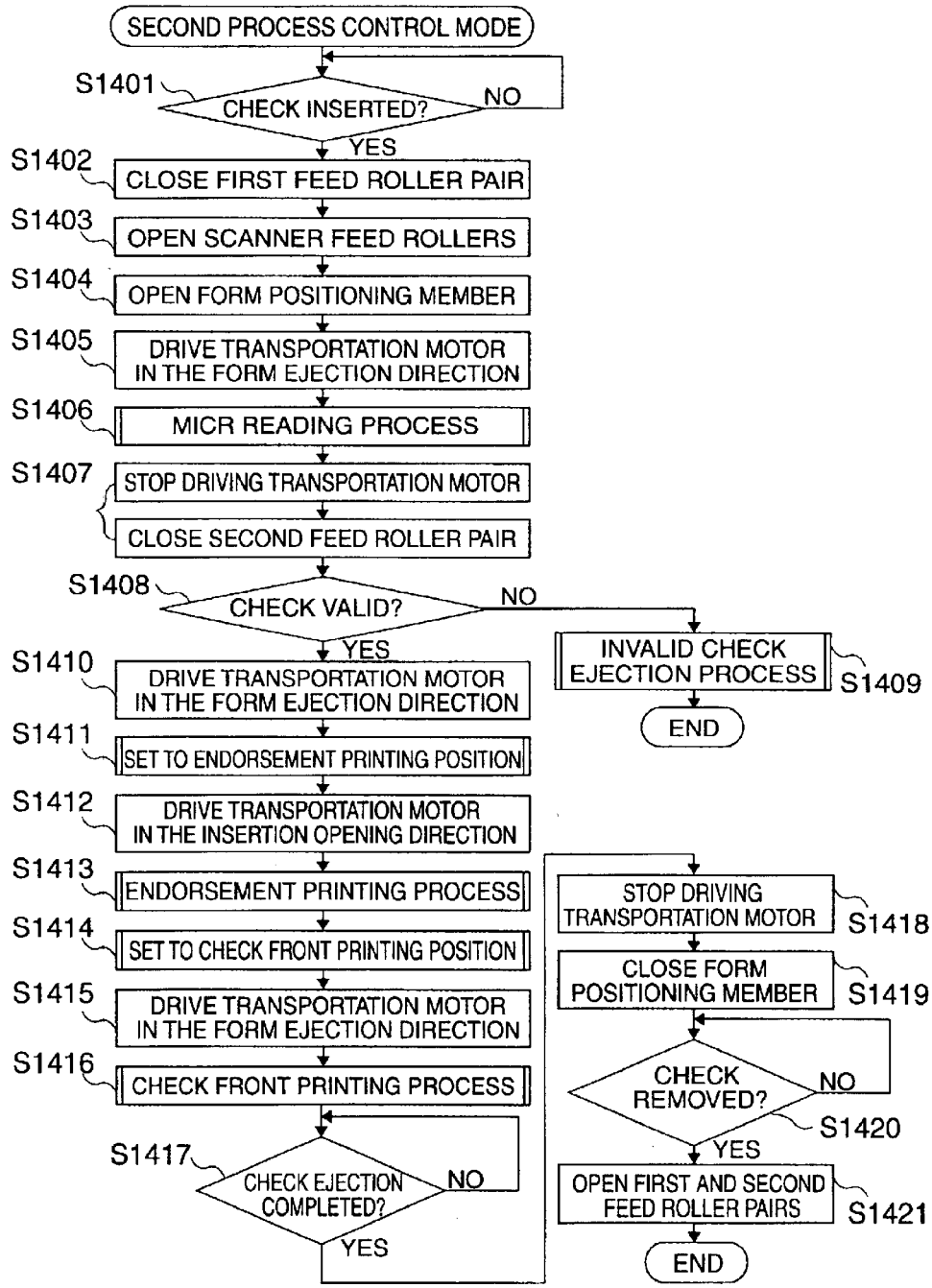
FIG. 18 is a flow chart showing the second process control mode.
Figure 19:
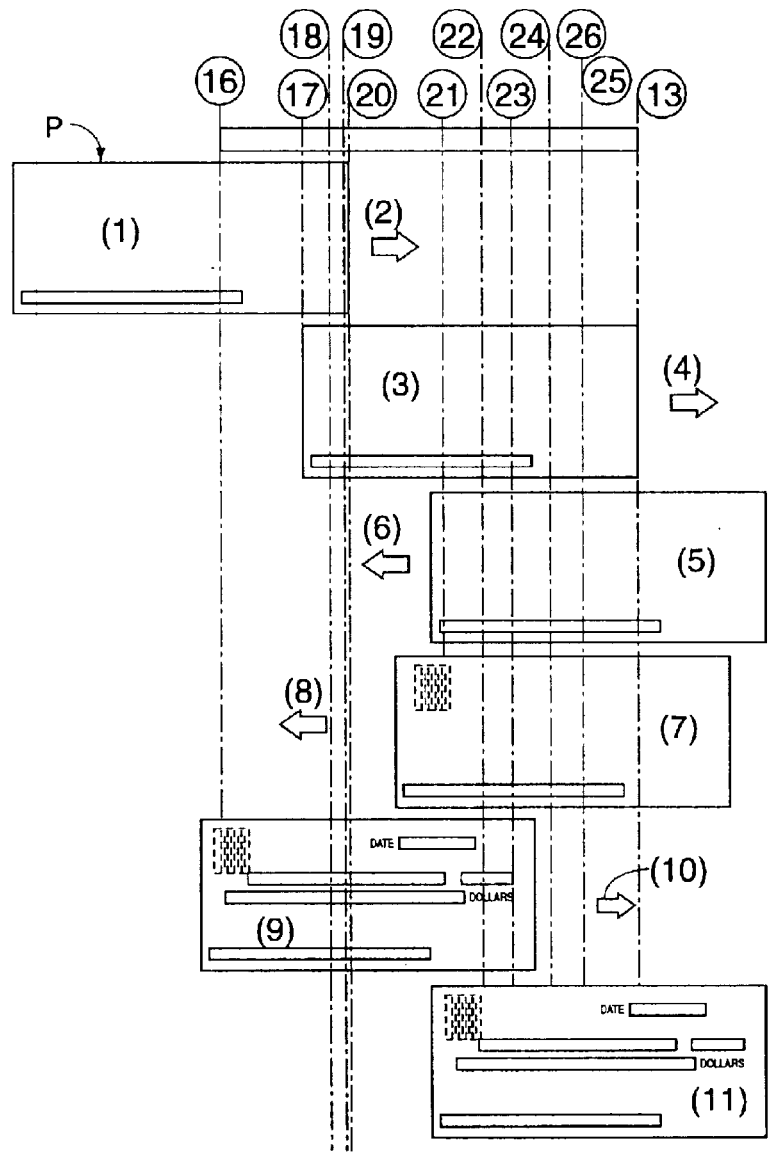
FIG. 19 depicts operation in the second process control mode.
Figure 20:
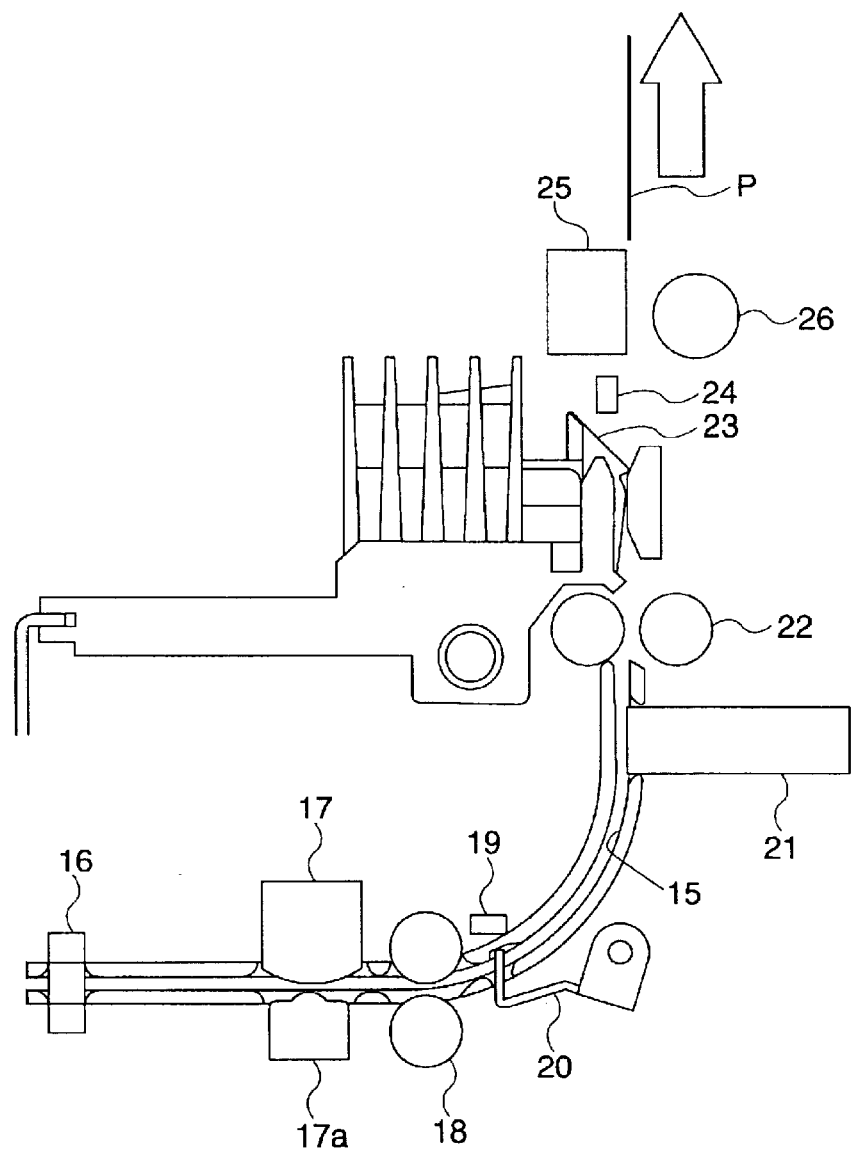
FIG. 20 is an internal side view of the multifunction device showing removal of an ejected check.

FIG. 18 is a flow chart of the second process control mode in which there is no scanning; FIG. 19 illustrates operation in the second process control mode, and FIG. 20 is an internal side view of the multifunction device when removing an ejected check. As will be evident from the figures, steps S1401 to S1416 in this second process control mode are the same as steps S801 to S816 in the first process control mode. These steps will be understood from the preceding description of the first process control mode in conjunction with FIG. 14 to FIG. 16.

After the check front printing process ends in the second process control mode it is decided whether to continue driving the form in the form ejection direction and eject the check P (S1417). If the form is to be ejected, driving transportation motor 46 stops (S1418, FIG. 19(11)) and the form positioning member 20 is closed (S1419).

The ejected check P is prevented from dropping into the transportation path 15 on the upstream side by the second feed roller pair 22 and is held within the vertical part of the transportation path 15 on the downstream side so that it will not fall out from the multifunction device 10.

Removal of the check P is then detected based on the detection signal from the paper exit detector 24 (S1420). If the check P was removed, the first and second feed roller pairs 18, 22 open (S1421, FIG. 20) and the second process control mode ends.

As will be appreciated from the preceding description, a multifunction device 10 according to a preferred embodiment of the invention has a transportation path 15 for guiding a check P, print heads 21, 23 positioned along the transportation path 15 for printing on the check P, a scanner head 25 positioned along the transportation path 15 for scanning the printed side of the check P, scanner feed rollers 26 positioned opposite the scanner head 25 for transporting the check P while pressing it against the scanner head 25, and a roller retraction mechanism 32 for retracting the scanner feed rollers 26 from the scanner head 25 and opening the transportation path 15. While the multifunction device 10 thus has scanner feed rollers 26 opposite the scanner head 25 for pressing a check P against the scanner head 25 while scanning the check, a multifunction device according to the present invention avoids checks P being caught by the scanner feed rollers 26 and thus prevents jams and skips in the form feed pitch by retracting the scanner feed rollers 26 when a check P enters between the scanner head 25 and scanner feed rollers 26.

Furthermore, because the trailing edge of a check P ejected by the scanner feed rollers 26 is held in vertical transportation path 15a on the downstream side of the scanner feed rollers 26, the number of parts can be reduced and the construction simplified compared with configurations having a special form holding member.

Furthermore, because the scanner focusing position A of scanner head 25 is offset either upstream or downstream on the transportation path from the scanner contact position B of scanner feed rollers 26, pressure from the scanner feed rollers 26 is prevented from being applied directly to the scanner focusing position A of scanner head 25. This reduces the likelihood transferred ink adhering to the scanner focusing position A in the scanning process after printing, and prevents as much as possible loss of quality in the scanned image due to such ink.

As also described above the roller retraction mechanism 32 has a freely rotatable pressure lever 34 for retracting and advancing the roller support shaft 30 of scanner feed rollers 26 from and to the scanner head 25, a presser spring 35 urging the pressure lever 34 toward the scanner head 25, a scanner feed roller solenoid 33 for retracting the pressure lever 34 in opposition to the urging force of the presser spring 35, and a drive system including planetary gear 40 positioned next to the pressure lever 34 for driving the scanner feed rollers 26. By thus supporting the scanner feed rollers 26 so the rollers can be freely advanced and retracted by the pivoting pressure lever 34, the roller retraction mechanism 32 can be compactly constructed, the rollers can be smoothly advanced and retracted, and drive power can be reliably transferred to the scanner feed rollers 26 because the scanner feed roller 26 drive system is positioned next to the pressure lever 34.

As also described above, the pressure lever 34 of the roller retraction mechanism 32 is located between the pair of scanner feed rollers 26 on the roller support shaft 30. The pressure lever 34 can thus substantially uniformly urge the pair of scanner feed rollers 26, and prevent form feeding problems due to differences in roller pressure. When the rollers are retracted the pair of scanner feed rollers 26 also move in parallel and the transportation path 15 can be reliably opened.

It should also be noted that the roller drive mechanism 36 is configured with a planetary gear mechanism causing the pressure lever 34 to operate in the retraction direction according to the drive load on the scanner feed rollers 26. More specifically, while a multifunction device according to the present invention has scanner feed rollers 26 opposite the scanner head 25 for advancing while pressing the check P against the scanner head 25, the scanner feed rollers 26 can be automatically retracted from the scanner head 25 according to the drive load of the scanner feed rollers 26. It is therefore possible to prevent problems such as damage to the transfer gears and scanner feed motor 37 and skipping of the scanner feed motor 37, with resultant undesirable noise due to overloading, even if the scanner feed rollers 26 directly contact the scanning glass 25a of scanner head 25 and the drive load increases.

As also described above, the roller drive mechanism 36 has a feed roller gear 41 rotating integrally with the scanner feed rollers 26, sun gear 39 rotated by power from the scanner feed motor 37 with the center of rotation near the center of pressure lever 34 rotation, and a planetary gear 40 disposed freely rotatably to the pressure lever 34 and meshed with the feed roller gear 41 and sun gear 39. The roller drive mechanism 36 can thus be achieved with a minimal number of parts, further contributing to reducing the part count and simplifying the overall configuration.

A check P advanced to the scanner head 25 by the second feed roller pair 22 is held between the scanner head 25 and scanner feed rollers 26 whereby the check P is also advanced. The scanner feed rollers 26 are driven at a peripheral velocity higher than the second feed roller pair 22 to apply appropriate tension to the check P and prevent scanning errors and jams caused by slack in the check P. The scanner feed roller drive load is also controlled automatically by the planetary gear mechanism, thereby preventing such problems as excessive tension on the check P and overloading the scanner feed motor 37.

Furthermore, because a pair of scanner feed rollers 26 is disposed on the roller support shaft 30 and the pressure lever 34 is located between the pair of scanner feed rollers 26, the pair of scanner feed rollers 26 can be advanced and retracted substantially in parallel, and problems such as skewing the check P due to variations in the form transportation force can be avoided.

Furthermore, because the pressure lever 34 has a paper presser guide 34b for aligning the check P with the scanning glass 25a of scanner head 25, drifting of the check P between the pair of scanner feed rollers 26 is controlled and scanning accuracy can be improved.

As also described above, a scanner feed roller solenoid 33 is also provided for forcibly rotating the pressure lever 34 in the retraction direction, and the gap between the scanner head 25 and scanner feed rollers 26 can be opened and closed by driving the solenoid 33. The check P can therefore be prevented from catching in the scanner feed rollers 26 by driving the scanner feed roller solenoid 33 to open the transportation path 15 when a check P is advanced between the scanner feed rollers 26 and scanner head 25. The total part count can also be reduced and the configuration simplified because the transportation path 15 can be opened and closed using the mechanism for retracting the scanner feed rollers 26 according to the drive load.

By disposing the scanner feed rollers 26, pressure lever 34, roller drive mechanism 36, and scanner feed roller solenoid 33 in a scanner feed unit 42 separate from the scanner head 25 in a configuration enabling the entire scanner feed unit 42 to be retracted from the scanner head 25, the space between the scanner head 25 and scanner feed rollers 26 can be opened widely by retracting the entire scanner feed unit 42. This makes it easy to remove paper jams in the scanner head 25 area, and makes it easy to clean the scanning glass 25a of scanner head 25.

Furthermore, by disposing platen 23a opposite the front print head 23 in this scanner feed unit 42, the area between the front print head 23 and platen 23a also opens widely when the scanner feed unit 42 is retracted, and paper jams in the front print head 23 area can also be easily removed.

Furthermore, by also including one roller 22a of the second feed roller pair 22 positioned on the upstream side of the scanner head 25 in scanner feed unit 42, retracting the scanner feed unit 42 also widely opens the gap between the rollers of the second feed roller pair 22. This makes it easy to remove paper jams in the second feed roller pair 22.

As will be known from the preceding description the present invention avoids sheets being caught in the pressure feed rollers and can prevent paper jams and shifts in the feed pitch while using pressure feed rollers opposite the scanner position for conveying a sheet while pressing the sheet to the scanner.

It is also possible to automatically retract the feed roller from the scanner based on the feed roller drive load while using pressure feed rollers opposite the scanner position for conveying a sheet while pressing the sheet to the scanner. It is therefore also possible to eliminate such problems as damage to the drive source and transfer gears, skipping of the stepping motor, and abnormal undesirable noises resulting from an increase in the drive load when the feed roller directly contacts the scanning glass surface.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A multifunction device comprising:

a transportation path that guides a sheet;

a print head positioned along the transportation path that prints on the sheet;

an image scanner head positioned along the transportation path that scans an image on the printed side of the sheet;

a pressure feed roller positioned opposite the image scanner head that transports the sheet while pressing the sheet against the image scanner head; and a roller retraction mechanism that retracts the pressure feed roller from the image scanner head and opens the transportation path; and wherein the pressure feed roller and roller retraction mechanism are positioned in a scanner feed unit that is retractable from the image scanner head; and further comprising a platen positioned in the scanner feed unit opposite the print head.

2. A multifunction device as described in claim 1, wherein a trailing end part of the sheet ejected by the pressure feed roller is held within the transportation path downstream from the pressure feed roller.

3. A muitifunction device as described in claim 1, wherein a focusing position of the image scanner head is offset to one of the upstream transportation side and downstream transportation side from a position of the image scanner head that contacts the pressure feed roller.

4. A multifunction device as described in claim 1, wherein the roller retraction mechanism comprises:

a roller support shaft that supports the pressure feed roller;

a rotating member that advances and retracts the roller support shaft toward and away from the image scanner head;

an urging member that urges the rotating member toward the image scanner head;

a solenoid that retracts the rotating member against the urging force of the urging member; and a drive mechanism positioned near the rotating member that drives the pressure feed roller.

5. A multifunction device as described in claim 4, wherein the rotating member is positioned between a pair of pressure feed rollers supported on the roller support shaft.

6. A multifunction device as described in claim 1, further comprising a pair of pressure feed rollers and wherein one of the pressure feed roller pair positioned upstream of the image scanner head is positioned in the scanner feed unit.

7. A scanner apparatus comprising:

a transportation path that guides a sheet;

an image scanner head positioned along the transportation path that scans an image on one side of the sheet;

a pressure feed roller positioned opposite the image scanner head that transports the sheet;

a rotating member supporting the pressure feed roller and that advances the pressure feed roller toward and retracts the pressure feed roller from the image scanner head;

an urging member that urges the rotating member toward the image scanner head; and a roller drive mechanism that transfers drive power to the pressure feed roller, the roller drive mechanism moving the rotating member in a retraction direction away from the image scanner head according to a driving load applied to the pressure feed roller.

8. A scanner apparatus as described in claim 7, wherein the roller drive mechanism comprises:

a motor;

a feed roller gear rotating integrally with the pressure feed roller;

a sun gear rotated by a drive source power of the motor; and a planetary gear freely rotationally supported on the rotating member and engaged with the feed roller gear and the sun gear.

9. A scanner apparatus as described in claim 7, further comprising an upstream-side feed roller positioned on an upstream-side of the pressure feed roller; and wherein the pressure feed roller is driven with a peripheral velocity higher than the upstream-side feed roller.

10. A scanner apparatus as described in claim 7, further comprising a print head that prints on the sheet and that is positioned on the upstream side of the image scanner head.

11. A scanner apparatus as described in claim 7, further comprising a pair of pressure feed rollers and a roller support shaft that supports the pair of pressure feed rollers; and wherein the rotating member is positioned between the pair of pressure feed rollers.

12. A scanner apparatus as described in claim 7, wherein the rotating member comprises a paper presser guide that aligns the sheet with a scanning surface of the image scanner head.

13. A scanner apparatus as described in claim 7, further comprising a solenoid that forcibly rotates the rotating member to open a space between the pressure feed roller and the image scanner head.

14. A scanner apparatus as described in claim 13, wherein the pressure feed roller, rotating member, roller drive mechanism, and solenoid are positioned in a scanner feed unit that is retractable from the image scanner head.

* * * * *

UNITED STATES PATENT AND TRADEMARK OFFICE
CERTIFICATE OF CORRECTION

PATENT NO. : 6,832,723 B2
DATED : December 21, 2004
INVENTOR(S) : Sadao Murata et al.

It is certified that error appears in the above-identified patent and that said Letters Patent is hereby corrected as shown below:

Title page,
Item [56], References Cited, U.S. PATENT DOCUMENTS, please add:
-- 5,825,393  10/1998.....347/171
   6,350,005  02/2002.....347/19
   6,257,783  07/2001.....400/578
   5,646,388  07/1997.....235/380
   5,757,431  05/1998 ....348/373
   5,771,071  06/1998 ....348/335

FOREIGN PATENT DOCUMENTS,
JP     11-164086    6/1999
JP     2000-255828  9/2000
JP     07-242044    9/1995
JP     07-276720   10/1995
JP     09-234924    9/1997
JP     2000-015886  1/2000
JP     2001-268315  9/2001
JP     2001-134702  5/2001
JP     2001-052603  2/2000 --

Signed and Sealed this

Fifth Day of July, 2005

JON W. DUDAS
*Director of the United States Patent and Trademark Office*